United States Patent [19]

Selim

[11] 4,219,821
[45] Aug. 26, 1980

[54] AUTOMATIC DIRECTION FINDING SYSTEM

[75] Inventor: Harold N. Selim, Wichita, Kans.

[73] Assignee: Regency Electronics, Inc., Indianapolis, Ind.

[21] Appl. No.: 940,254

[22] Filed: Sep. 7, 1978

[51] Int. Cl.$^2$ .............................................. G01S 3/20
[52] U.S. Cl. ................................. 343/113 R; 343/728
[58] Field of Search ..................... 343/113 R, 728, 867

[56] References Cited

U.S. PATENT DOCUMENTS

| | | | |
|---|---|---|---|
| 2,419,673 | 4/1947 | Busignies et al. | 343/867 |
| 3,490,024 | 1/1970 | Sherrill et al. | 343/113 R |
| 3,824,596 | 7/1974 | Guion et al. | 343/113 R |

FOREIGN PATENT DOCUMENTS 998883  7/1965  United Kingdom ................ 343/113 R

OTHER PUBLICATIONS

Terrence Rogers, A Dopple ScAnt, QST, May 1978, pp. 24-28.

*Primary Examiner*—T. H. Tubbesing
*Attorney, Agent, or Firm*—Woodard, Weikart, Emhardt & Naughton

[57] ABSTRACT

An automatic direction finding (ADF) system including a direction finding antenna array which connects to a radio receiver to process an audio output signal selectively illuminating a segment of a segmented circular visual directional display indicating the direction from which the received signal arrived. In an FM version, the ADF system electronically switches between antennas in the direction finding antenna array alternately incorporating vector information onto the received carrier in a manner that can be phase detected to produce an audio frequency signal within the normal pre-audio bandpass of the receiver. The audio frequency is then demultiplexed to produce separate vector signals. These separate vector signals are then processed for selectively illuminating a segment of the segmented circular visual directional display. When a sufficiently strong signal is not being received, the ADF system sequentially illuminates each segment of the segmented circular visual directional display in a clockwise direction at a rate which can be readily and visably perceived by an operator. This operation conveys the image of circuit activity, is exciting for an operator to watch, and may have the effect of simulating a radar sweep, although it is in no way related to the searching by the receiver. An additional segment is positioned in the center of the display to indicate the processing of a received radio frequency signal by the ADF system.

105 Claims, 25 Drawing Figures

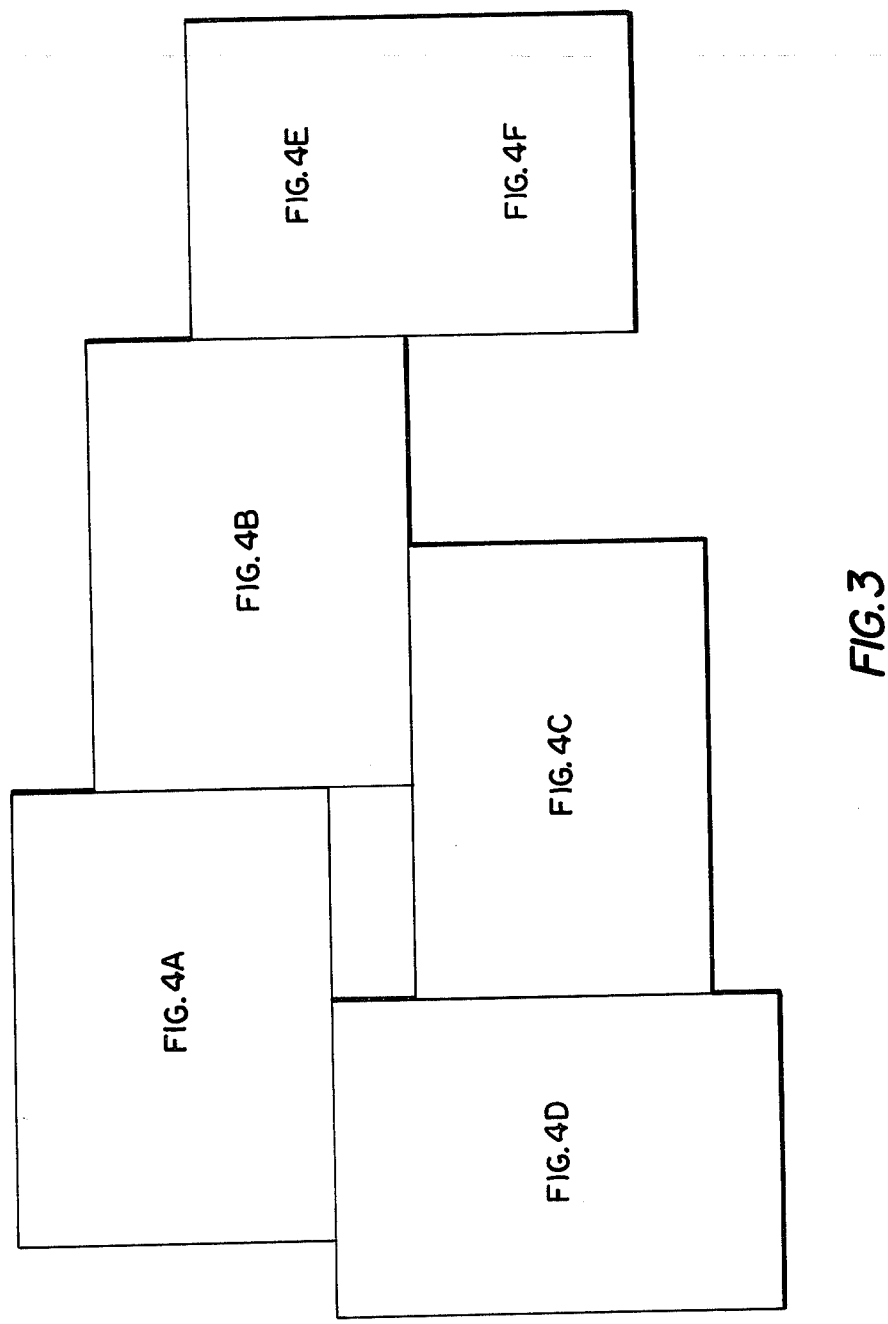

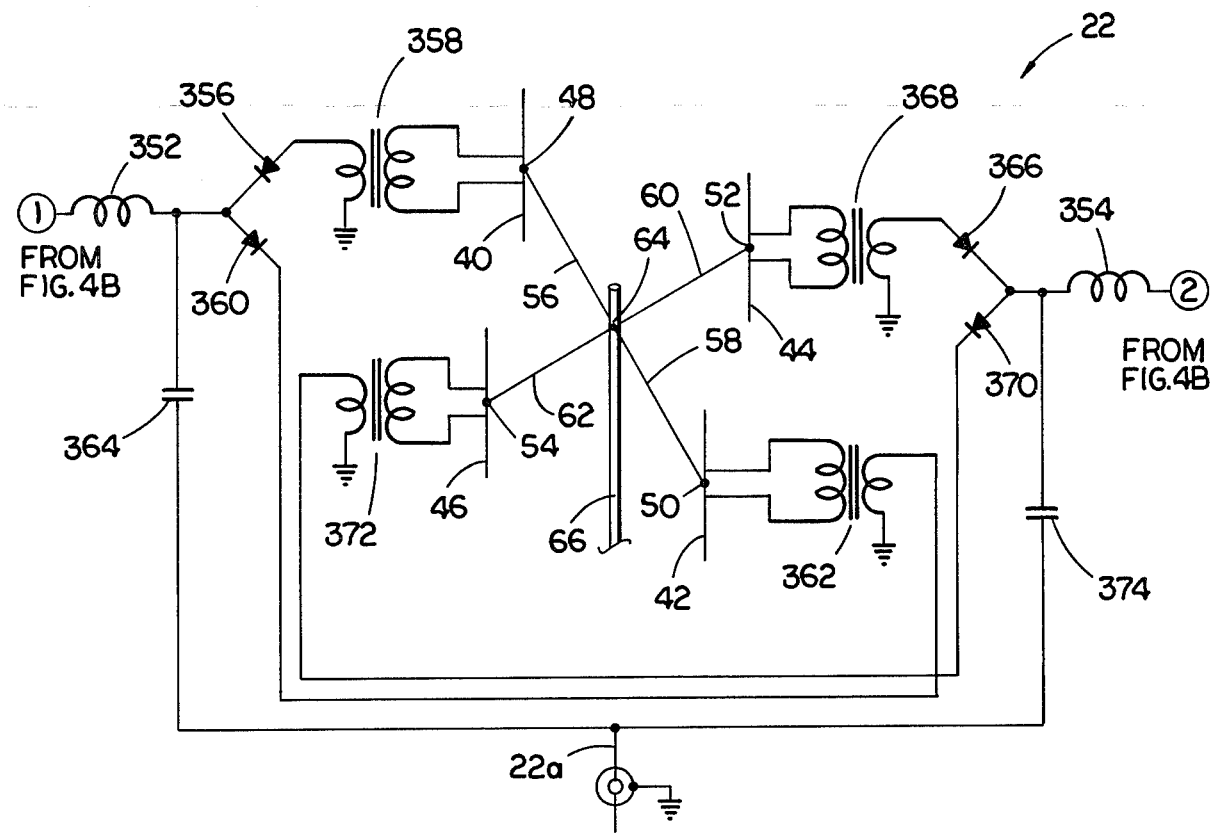
FIG. 4E
TO FM RECEIVER 20
FIGURES 1 AND 2
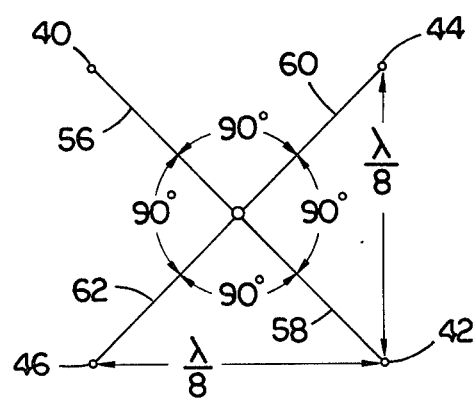
FIG. 4F

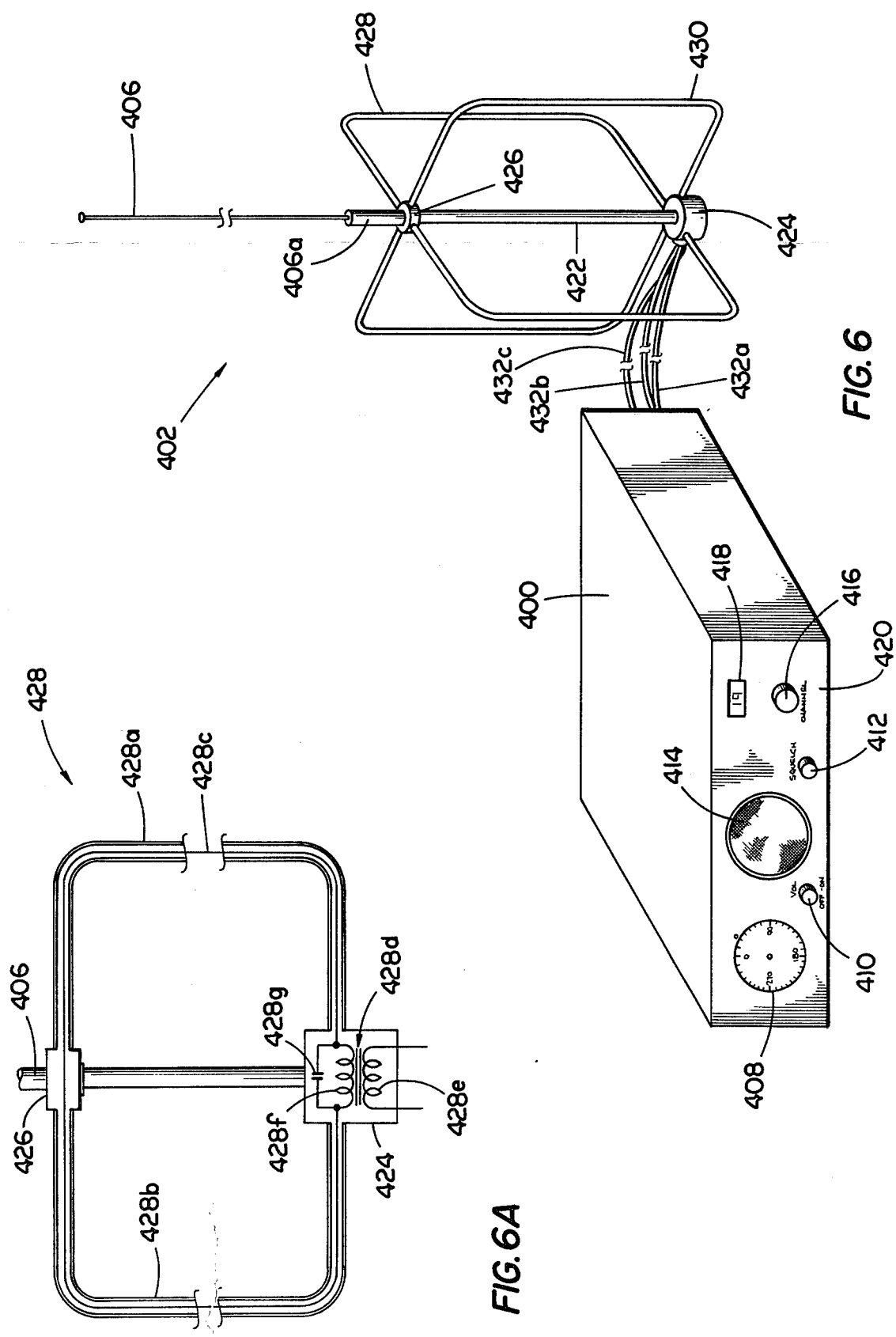

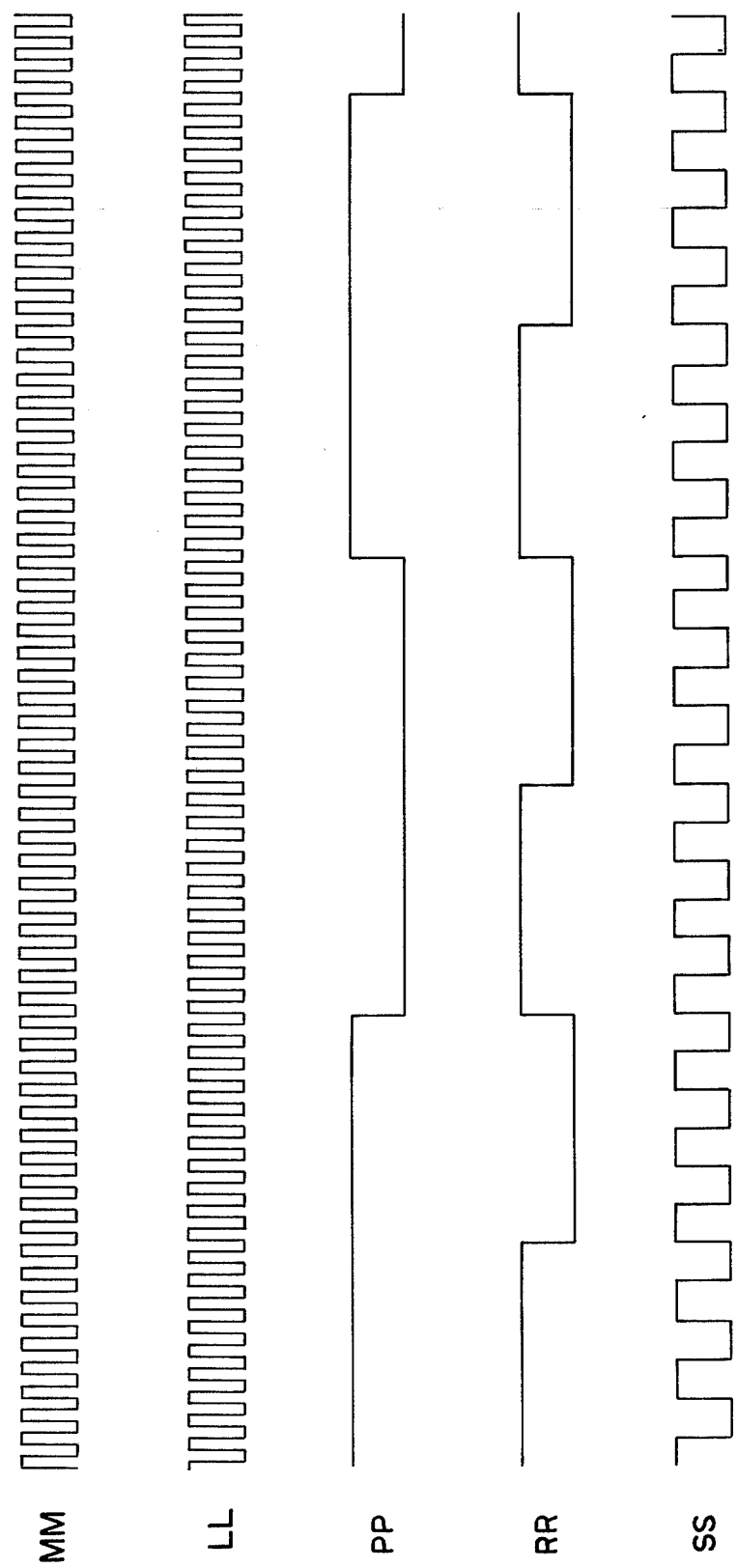

AUTOMATIC DIRECTION FINDING SYSTEM

BACKGROUND OF THE INVENTION

1. Field of the Invention

The present invention relates to an automatic direction finding system.

2. Description of the Prior Art

One of the most critical problems confronting the users of automatic direction finding systems is to inexpensively and simply "direction find" (DF) an originating source of transmission of a received radio frequency signal and accurately display the processed received signal information indicating the direction from which received signals arrived.

Prior art direction finding devices have evolved through the art since the early 1930's when direction finding techniques essentially amounted to manual turning of a Finch Sense Loop to determine the null of the received radio frequency signal indicating that the originating source of the radio frequency signal was located on either side of the plane of the loop. After two or more direction fixes had been taken on the received radio frequency signal at different physical locations, an operator could triangulate the originating source of transmission of the received radio frequency signal.

Last prior art direction finding devices comprised a sense antenna utilized with a loop antenna making it possible to determine the sense of direction of the originating source of transmission of the received radio frequency signal.

Prior art automatic direction finding systems evolved with such systems utilizing two or more antennas and displaying the processed received information in a variety of different ways such as on an indicating meter indicating a left or right direction of signal arrival, electromagnetic coils operating a directional compass, bearing displays, autocompasses, cathode ray tube displays, etc.

Some prior art automatic direction finding (ADF) systems required physically large and expensive antenna arrays switched manually or electronically which were connected to a signal processing circuit to subsequently display the relative direction of the originating source of the received radio frequency signal. Other prior art automatic direction finding systems utilized complex and expensive electromechanical or electronic circuitry to process the radio frequency signal received by the direction finding antenna array to yield directional information of the originating source of the received radio frequency signal.

The prior art automatic direction finding systems generally required complex modifications to existing receiver circuitry thereby not realistically permitting the receiver to be utilized solely as a receiver, but only as a receiver specially designated for use with the automatic direction finding system. Some prior art direction finding systems required receivers to have two separate distinct receiver channels to process the received radio frequency signals. Such dual channel receivers were undesirable and expensive in addition to being impracticable for most direction finding needs.

Representative prior art patents disclosing automatic direction finding systems illustrating the prior art devices as discussed in the previous paragraphs are further elaborated on in the following paragraphs.

Jarvis, U.S. Pat. No. 2,586,342, discloses a tricoordinate radio direction finder receiver utilizing a commutating switch for controlling the switching of the energies picked up by three loop antennas so as to impress the energies in sequence upon the input circuit of the radio receiver. The electronics includes sample and hold amplifier circuits to retain the signal levels received by each antenna. The circuit of Jarvis does not involve the multiplexing of any signals onto the received signal but rather merely achieves periodic changes in amplitude in the received carrier which are sampled and stored in synchrony with the commutation among the three loop antennas. Such an amplitude sensitive technique is totally inappropriate for conventional FM receivers which have significant limiting in the IF stages. The technique is also difficult in AM receivers having fast acting AGC circuits.

Weill, U.S. Pat. No. 3,303,504 discloses an ADF system having switching circuits for deriving directional information from the radio frequency signals of quadrature directional loops and an omnidirectional sensing antenna. A reversing switch is placed in the two leads of each of the pair of loops and the loops are driven in succession to cause the resulting cardioid to aim successively in each of four orthogonal directions. A resolver and direction indication with four equally, angularly disposed field producing elements are provided. A freely rotatable pointer is responsive to the resultant field of the four elements. A square wave generator with flip-flops is provided for successively operating the four switches to connect the resolver elements to the detector in synchronism with the successive operation of the loop reversing switches.

Yello, U.S. Pat. No. 3,435,455, discloses a direction-finder navigation receiver having an antenna modulator for combining alternately in-phase and out-of-phase, in response to an applied switching control signal, the RF signals from an omni-directional sense antenna with those from a directional loop antenna to produce overlapping cardiod antenna response patterns. A transformerless output switching demodulator compares the magnitudes of the in-phase and out-of-phase signals to determine the relative bearing of a received transmission. A pair of audio switching stages contained in the demodulator alternately translates oppositely-phased detector output signals from the receiver circuits in synchronism with the alternation of the antenna patterns to form a full-wave D C signal.

Grillot et al., U.S. Pat. No. 3,564,548, disclose a method and apparatus for crystal controlled automatic direction finding which is typical of the prior art automatic direction finders utilizing the conventional two antenna concept of the sense antenna and the loop antenna (which sense the electric and magnetic fields respectively). While the sense antenna signal is brought into the receiver and applied to a first tuned circuit through a rejection filter, the signal picked up by the loop antenna is transmitted to a goniometer and then into the first loop rf amplifier.

Guion et al., U.S. Pat. No. 3,824,596, disclose an automatic sector indicating direction finder system which incorporates a receiving antenna arrangement incorporating four separate antenna patterns, each having a field pattern which is a function of the azimuth angle, the apparatus forming antenna signals which are then transferred through a plurality of antenna-sequencing relays to a dual channel receiver. The two outputs of the dual channel receiver are applied to phase detectors and amplitude detectors which determine the relative amplitude ratios. These ratios and the phase measurements are stored in memory momentarily and are then strobed from memory through a hard wired decoding logic circuit to an external display of sixteen sectors, all equal in size to indicate the sector location of a target.

The previously discussed prior art automatic direction finding systems have failed to provide an inexpensive and simple automatic direction finding system for use with an ordinary off-the-shelf communications receiver.

SUMMARY OF THE INVENTION

One aspect of some embodiments of the invention is a circuit of an automatic direction finding system in which two vector signals from two antenna means are multiplexed onto the received signal and are separately detected from the phase or frequency demodulated audio, and thereafter used to control an indicator of the direction from which the received signal arrived. Another aspect of some embodiments of the invention is a circuit of an automatic direction finding system in which two vector signals from two antenna means are multiplexed onto the received signal and are separately detected from filtered demodulated audio, and thereafter used to generate a single phase modulated audio frequency signal, the phase of which is used to control an indicator of the direction from which the received signal arrived. Another aspect of some embodiments of the invention is a directional display which appears to sequence through various directions at a visually perceptible rate when no signal of sufficient strength is being received, although such sequencing is not actually related to the direction finding operation.

The phrase "automatic direction finding system" is used herein to include components of an ADF system which includes a direction finding antenna assembly, a radio communications receiver, and an ADF system signal processor connected to the audio output of the receiver and including a display to indicate the direction from which the received signal arrived.

According to one preferred embodiment of the present invention, there is provided (1) an ADF system signal processor utilized with (2) a direction finding antenna array including two pair of antennas, one pair being orthogonally positioned with respect to the other, and (3) a frequency modulation receiver having an antenna terminal to receive a frequency modulated radio frequency signal and an audio output terminal. The ADF system signal processor has an oscillator to generate a clock source of frequency, dividers connected to the oscillator to selectively divide the clock source of frequency and generate chopper signals, latches connected to the dividers to count the output of the dividers, a circular segmented visual directional display connected to the latches to display the count of the latches, switching signal counters connected to the dividers to generate antenna commutating signals and synchronous detection signals, a sweep display connected between the oscillator and the switching signal counter and to the latches to sequentially illuminate the display in a clockwise direction when no sufficient radio frequency signal is being received by the frequency modulation receiver, switching means for switching each antenna of said pair of antenna means and the two pairs of antennas switched by the antenna commutating switching signals of the switching signal counters, the two pairs of antennas connected to the antenna terminal of the receiver, a first filter connected to the audio output terminal of the receiver, two synchronous detectors serially connected to two buffers to the first filter to process vector information for each of the pair of antennas and the synchronous detectors switched by the synchronous detector switching signals of the switching signal counters, choppers connected to each of the buffers and switched by the chopper signals of the divider, a second filter connected to the choppers to integrate and filter the signals from the two choppers and outputting a sine wave signal having a phase component, and a sweep signal control connected between the second filter and the latches to detect a zero crossover of the phase component of the sine wave signal whereby the sweep signal control latches the latches on a count of said dividers, said dividers phased locked to the chopper signals of the divider thereby selectively illuminating a segment of said display indicating the direction from which the received signal arrived.

According to another preferred embodiment of the present invention, there is provided (1) an ADF system signal processor utilized with (2) a direction finding antenna array including two loop antennas orthogonally positioned with respect to each other and each loop electrostatically shielded and a sense antenna positioned at the intersection of the loop antennas, and (3) an amplitude modulation receiver having an antenna terminal to receive an amplitude modulated radio frequency signal, and an audio output terminal. The ADF system signal processor has an oscillator to generate a clock source of frequency, dividers connected to the oscillator to selectively divide the clock source of frequency and generate chopper signals, latches connected to the dividers to count the output of the dividers, a circular segmented visual directional display connected to the latches to display the count of the latches, switching signal counters connected to the dividers to generate antenna loop commutating switching signals, synchronous detection switching signals, and a loop commutating switching signal, a sweep display connected between the oscillator and the switching signal counter and to the latches to sequentially illuminate the display in a clockwise direction when no radio frequency signal is received by the amplitude modulation receiver, a loop antenna selector connected to each of the loop antennas which are switched by the loop antenna commutating switching signals of the switching signal counter, loop antenna amplifier and phase splitter serially connected to the loop antenna selector, a loop commutator connected to the phase splitter and switched by the loop commutating switching signal of the switching signal counter, an automatic gain control and threshold adjustment amplifier connected to the automatic gain control signal of the receiver to generate a threshold adjusted automatic gain control signal, a summation amplifier to sum the received radio frequency signal received by the sense antenna of the direction finding antenna array and the commutated radio frequency signal from the loop commutator added at a reduced injection level controlled by the threshold adjusted automatic gain control signal and connected to the antenna terminal of the amplitude modulation receiver, two synchronous detectors serially connected to two buffers to a first filter to process vector information for each of the loop antennas and the synchronous detector switched by the synchronous detector switching counter, choppers connected to each of the buffers and switched by the chopper signals of the divider, a second filter connected to the choppers to integrate and filter the signals from the two choppers outputting a sine wave signal having a phase component, and a sweep signal control connected between the second filter and the latches to detect a zero crossover of the phase component of the sine wave signal whereby the sweep signal control latches the latches on a count of said dividers, said dividers phase locked to the chopper signals of the divider thereby selectively illuminating a segment of said display indicating the direction from which the received signal arrived.

One significant aspect and feature of certain embodiments of the present invention is an ADF system having a thirty-six segment, circular visual directional display which indicates the direction of the originating source of the received radio frequency signal. The thirty-six segment, circular visual directional display has a precision of ten degrees (five degrees on either side of the selectively illuminated segment) in indicating the direction of the originating source of the received radio frequency signal. While the segmented circular visual directional display can utilize any type of visual display devices such as gas discharge, neon displays, liquid crystal displays, etc., the display particularly lends itself to the utilization of thirty six light emitting diodes positioned circumferentially on a two inch diameter circle.

Another significant aspect and feature of some embodiments of the present invention is an ADF system having a segmented circular visual directional display where each visual display device is sequentially activated in a clockwise direction, giving the appearance that the ADF system is functioning. The sequential clockwise activation of each of the segments of the segmented circular visual directional display yields the visually perceivable psychological effect that the automatic direction finding system is searching, scanning, sweeping like a radar, etc. When an ADF system having light emitting diodes in its display receives the radio frequency signal, the direction-indicating segment of the circular directional display promptly illuminates regardless of the position of the segment being sequentially illuminated during the immediately preceeding sequential clockwise illumination. By way of example and for purposes of illustration only, if the segments in the lowest portion of the visual directional display, the 180° direction, are being sequentially illuminated and a radio frequency is received from the 360° direction, then the 360° top segment selectively illuminates while the sequential illumination in the lower portion of the visual directional display ceases. Eventhough rarely perceived by the casual observer, in actuality, the illumination of the selective segment indicating the direction from which the signal arrived jumps to the selective segment corresponding to the direction from which the radio frequency signal arrived regardless of the position of the segments being sequentially illuminated on the circular visual directional display.

A further significant aspect and feature of some embodiments of the present invention is an additional visual indicator in the center of the segmented circular visual direction display. This additional indicator activates when the ADF system is locked on the received radio frequency signal. In one preferred enbodiment of the automatic direction finding system used with the frequency modulation receiver, the center segment continuously illuminates when the FM receiver is receiving an rf signal and the ADF system has processed the audio signal from the receiver. In another preferred embodiment of the automatic direction finding system used with an AM receiver, the center segment is continuously illuminated when the receiver is receiving a radio frequency signal of low signal strength and the ADF system has processed the audio signal from the receiver, and the center segment flashes when the receiver is receiving a rf signal of a high signal strength and the ADF system has processed the audio signal from the receiver.

Having briefly described preferred embodiments of the present invention, it is a principal object hereof to provide an automatic direction finding system using a frequency modulation receiver and an automatic direction finding system using an amplitude modulation receiver.

An object of the present invention is to provide an ADF system used with a receiver to indicate the direction from which a received signal arrived with respect to the position of a direction finding antenna array. In some embodiments the ADF system selectively illuminates a segment of a thirty-six segment circular visual directional display indicating the direction the received signal arrived. Such directional information is extremely useful in search and rescue for life and property at sea on the marine radio frequencies, in search and rescue of life and property on the aviation radio frequencies, in identifying unknown sources of radio frequency signal transmission for law enforcement functions where radio is used in the futherance or in the commission of crime, in identifying the location of unknown sources of radio frequency signals in locating interference, malicious and otherwise, etc. The ADF system of the present invention is particularly fascinating, and economical, for the shortwave listener and the hobbyist including the amateur operator and citizens radio service (CB) operator in locating the orginating transmission source of radio frequency signals. This ADF system in useful for the popular sport of DF (direction finding) hunts of hidden transmitters which tests an individual's skill in triangulating DF bearings to reach the originating source of transmission of a radio frequency signal. This ADF system is also particularly useful to locate orginating transmission sources of radio frequency signals causing malicious interference, violating the rules and regulations of the Federal Communications Commission such as operating outside of assigned portions of the frequency spectrum, transmitters having "stuck carriers", locating stolen transmitters such as police walkie-talkies, etc. The ADF system of the present invention, being lightweight, relatively compact and economical, particularly lends itself for utilization with mobile receiving or transceiving systems such as on ships, pleasure watercraft, vehicles such as automobiles or trucks, and on aircraft such as fixed wing airplanes or rotary wing helicopters.

Another object of the preferred embodiments of the present invention is an automatic direction finding system which can be operated by an individual and which does not require any radio operator skills other than turning on the radio receiver and tuning the radio receiver to a desired frequency. A further object of the preferred embodiments of the present invention is to provide a segmented circular visual directional display which selectively illuminates a segment of the display to indicate the direction of arrival of a received signal. A center segment in the circular segmented visual directional display illuminates when the receiver is receiving a signal and the ADF system is locked onto the received rf signal. In the preferred ADF system used with the FM receiver, the center segment is continously illuminated when receiving a signal and in the automatic direction finding receiver system used with the amplitude modulation receiver, the center segment is continuously illuminated when receiving a signal of low signal strength and is flashed when receiving a signal of high signal strength.

An additional object of some embodiments of the present invention is an ADF system which includes a conventional frequency modulation (FM) receiver and of other embodiments is an ADF system which includes a conventional amplitude modulation (AM) receiver. In such embodiments, the FM and AM ADF systems utilize similar circuits to divide a clock source of frequency and toggle latches utilized in conjunction with a sweep display to sequentially illuminate segments in a circular visual direction display in a clockwise direction when a radio frequency signal is not being received by the receiver. Such FM and AM ADF systems preferably utilize logic circuits to commutate the direction finding antenna arrays connected to the receivers and to generate switching signals for the synchronous detector and chopper circuits. Additional circuitry is provided for the AM ADF system to commutate the loop antenna signals, and mix the loop commutated signal and sense antenna radio frequency signals. The ADF system signal processor circuits for the preferred FM and AM automatic direction finding systems are identical in electrical circuit configuration and only differ in component values, switching frequencies and resonant frequencies of the filters.

Still another object of some embodiments of the invention is to provide an automatic direction finding system having switching signals which are compatible with the audio signal of the receiver and which generate a marginally audible, signal of a frequency which is not typically objectionable to the listner of the receiver. If desired, an audio filter can be placed in the audio stages of the receiver to reduce to level of the signal. A carrier phase shifted signal is generated on the received signal and is detected as an audio frequency tone along with the audio signal. The marginally audible tone adds to the glamour and mystique of using the ADF system as does the squelch burst or squelch tail in squelched receivers.

A still further object of some embodiments of the invention is to provide an automatic direction finding system utilizing a direction finding antenna array of simplistic construction and of minimal size permitting fixed, portable, and mobile operation of the automatic direction finding system with the receiver. The preferred FM ADF system utilizes a direction finding antenna array of two pairs of spaced antennas, each pair of antennas spaced less than one-half wavelength apart and at right angles to the other pair of antennas. The antennas can be dipole antennas, vertical whip antennas, or any other suitable antennas. PIN diodes switch between the pairs of antennas. The preferred AM ADF system utilizes a direction finding antenna array having two loops intersecting at right angles and a sense antenna positioned above the intersection of the loops.

Another further object of the preferred embodiment of the present invention is to provide an ADF system utilizing readily available frequencies. The preferred FM ADF system utilizes the synthesized frequency of 10.240 MHz which is common to a large percentage of VHF FM Marine Radio Telephone transceivers. The antenna commutating signals and synchronous detector signals are 1.11 kHz signals conveniently generated by approprately by dividing the 10.240 MHz synthesized frequency. The preferred AM direction finding system utilizes similar distinctive frequencies.

A still additional object of some embodiments of the present invention is to provide an external directional calibration control to electronically fine tune the ADF system to a zero reference direction of received radio frequency signals, commonly the north direction for fixed systems and directly forward for mobile systems. When the direction finding antenna array has been physically installed and positioned generally towards a zero reference direction, it may be desirable to electronically adjust the ADF system to accurately correlate to the actual zero reference direction.

A still further object of the preferred embodiment of the present invention is to provide an external direction calibration control which electronically correlates the direction indicator of the ADF system to compensate for any interferring physical structures adjacent the direction finding antenna array, etc. This external directional calibration control is an operator feature and permits adjustment of the automatic direction finding system in the range of ten degrees.

Still an additional object of some embodiments of the present invention is the utilization of one phase or frequency modulation detector in the receiver for detecting time multiplexed signals from the antenna array which are at a modulating frequency which is within the audio passband of a conventional receiver. The time multiplexing alternately provides for a first phase modulation of the received rf signal at a specific audio frequency, the degree of modulation being representative of a first vector which is a component of the direction of arrival of the received radio frequency signal with respect to the direction finding antenna array and like provides for a second phase modulation of the received rf signal at a specific audio frequency, the degree of modulation being an representative of a second and different vector which is a component of the direction of arrival of the received radio frequency signal with respect to the direction finding antenna array.

Still a further object of some embodiments of the invention is to generate a continuous phase shifted sine wave signal from two direct current vector values, either positive or negative, stored on capacitors. The phase component of the phase shifted signal is indicative of the direction of arrival of the received rf signal. The generated signal is subsequently utilized to control the selective illumination of a segment of a segmented circular visual directional display.

Still a further additional object of some embodiments is deriving two separate signals from the direction finding antenna array, electrical processing the two signals through a series of single stages including the rf and IF stages of a receiver and an audio frequency filter, separately and alternately detecting the two signals and storing the detected signals, and then recombining the stored signals to form a phase shifted signal to indicate the direction of arrival of a received radio frequency signal.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 3, illustrates the placement of the sheets of drawings of FIGS. 4A–4F;

FIGS. 4A–4E illustrate the electrical circuit schematic diagram of the automatic direction finding system for utilization with the frequency modulation receiver of FIG. 1;

FIG. 4F illustrates a top view of antenna spacing for the antenna shown in FIG. 1;

FIG. 6 illustrates a perspective view of another preferred embodiment of the present invention, an automatic direction finding system of utilization with an amplitude modulation receiver;

FIG. 6A illustrates a vertical section view of the first loop antenna of FIG. 6;

FIGS. 10A–10C illustrate the timing diagrams of the signals of the ADF system of FIG. 6.

DESCRIPTION OF PREFERRED EMBODIMENTS

Figure 1:
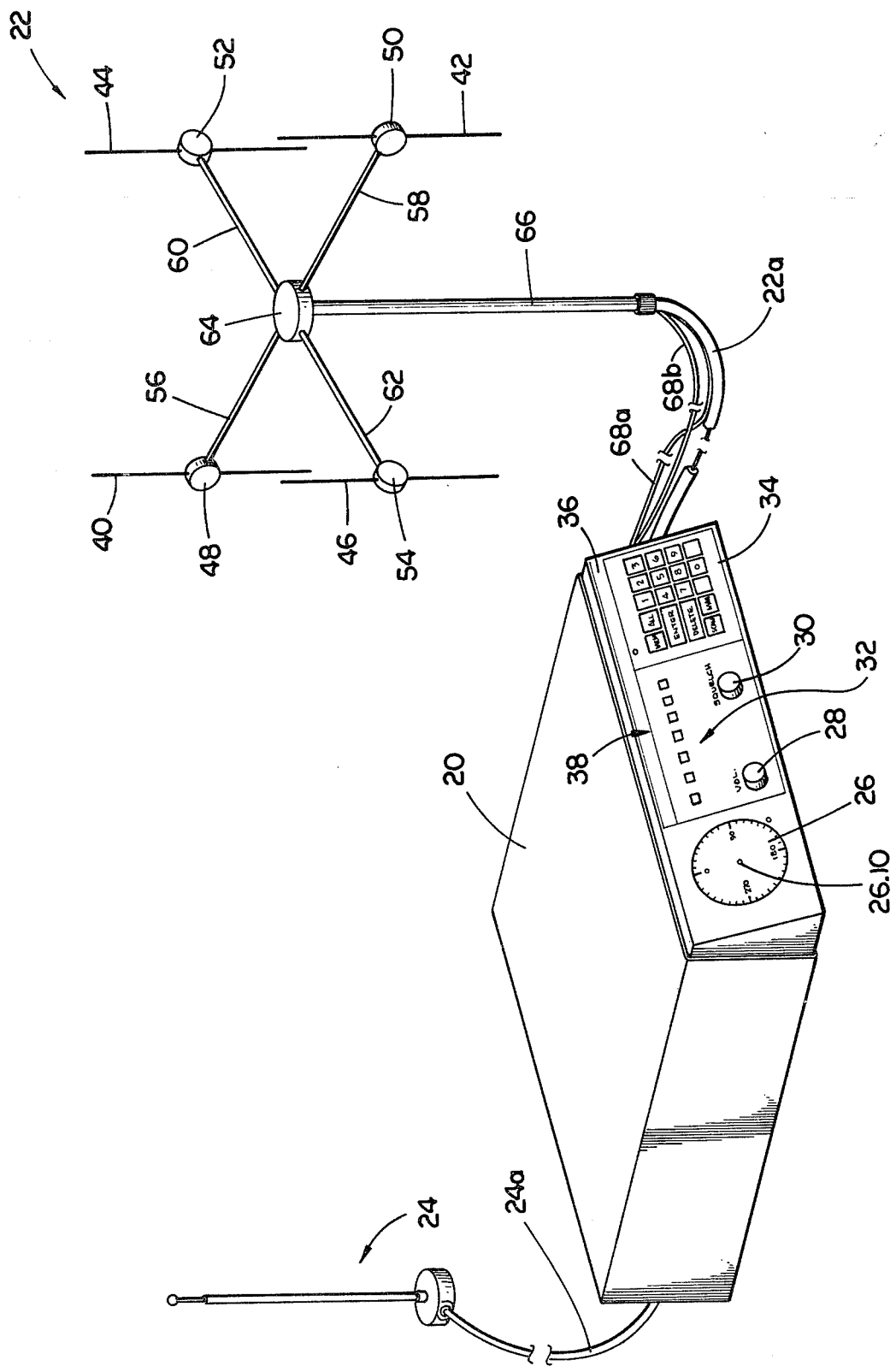
FIG. 1, illustrates a perspective view of one preferred embodiment of the present invention, an automatic direction finding system for utilization with a frequency modulation receiver.

FIG. 1, which illustrates a perspective view of one of the preferred embodiments of the ADF system utilized in a frequency modulation receiver, shows a VHF (very high freqency) FM marine transceiver 20 having the receiver antenna terminal connected to a receiver direction finding antenna array 22, with a coaxial cable transmission line 22a and the transmitter antenna terminal connected to a transmitter antenna 24 with a coaxial cable transmission line 24a. The transmitter antenna 24 can be any suitable vertical antenna as desired. A thirty-six segment circular visual directional display 26 having a center segment 26.10, a volume on-off control 28, a squelch control 30, an array of functional control switches 32, a numeric keyboard 34 and an illuminated indicator panel 36 are positioned as illustrated on the front 38 of FM transceiver 20.

The direction finding antenna array 22 physically comprises four half-wavelength dipole antennas 40, 42, 44 and 46 supported by suitable mechanical insulators 48, 50, 52 and 54. While dipole antennas are preferred, less preferred vertical monopole antennas or other suitable antennas can be substituted. Horizontal support numbers 56, 58, 60 and 62 extend radially at 0°, 180°, 90° and 270° from the center insulator 64 to insulators 48, 50, 52 and 54, respectively. A mast 66 supports the center insulator 64. Switching cables 68a and 68b connect antenna commutating switching signals from the automatic direction finding system signal processor to PIN switching diodes 356, 360, 366 and 370 in the insulator 64 of the direction finding antenna array 22 as later described with respect to FIGS. 4A–4F and as illustrated in FIG. 4E.

Figure 2:
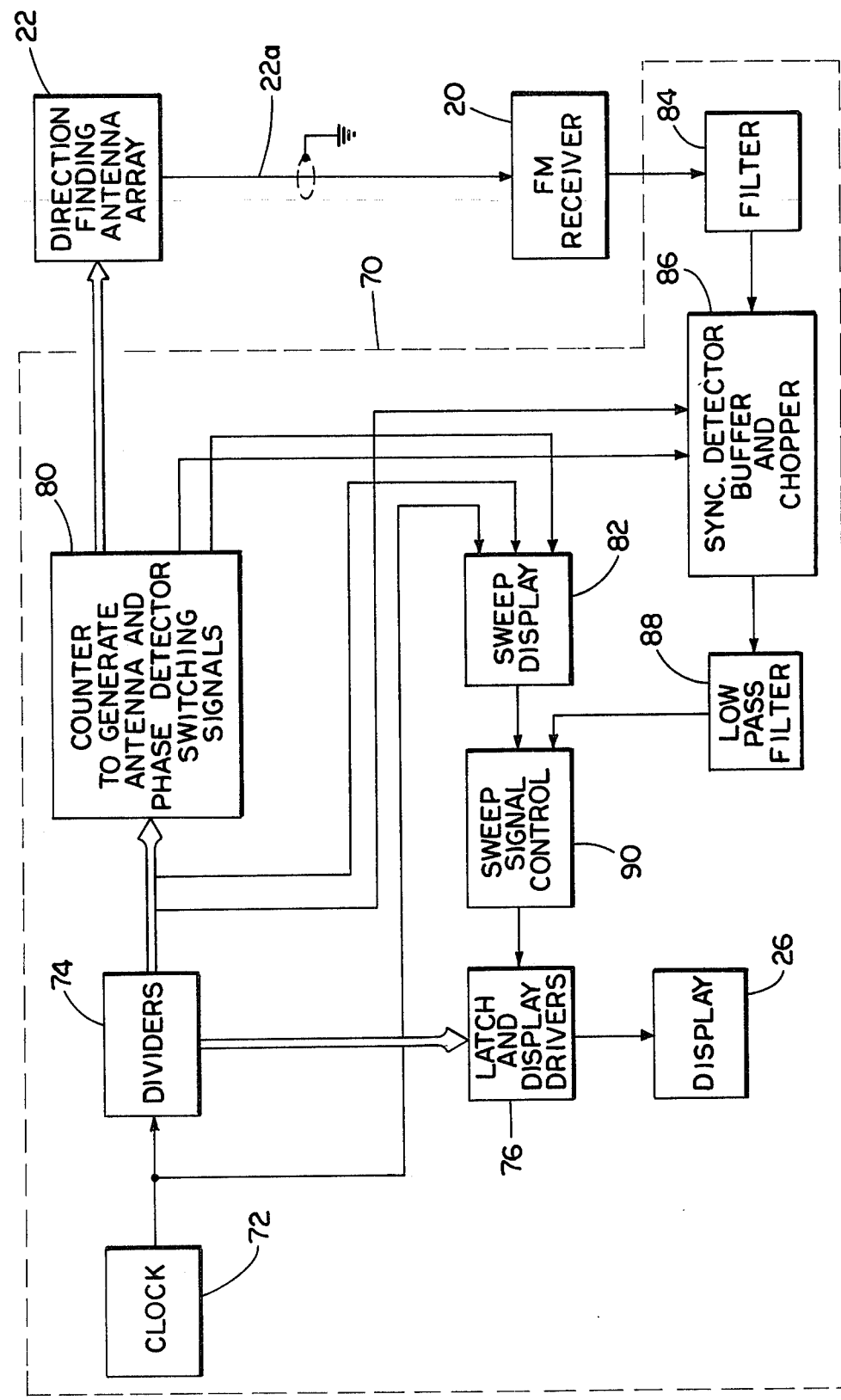
FIG. 2, illustrates a block diagram of the automatic direction finding system of FIG. 1.

FIG. 2 illustrates a block diagram of the ADF system which includes an FM receiver 20. FIG. 2 shows the automatic direction finding system signal processor 70 positioned within the dashed line of the figure and connected both to the FM receiver 20 and to the direction finding antenna array 22. A clock 72 generates a source of frequency which is divided by dividers 74. Latch and display drivers 76 operate to retain and produce at their output a selected binary count from the output of the dividers 74. The segmented circular visual directional display 26 displays the decoded retained count at the output of the latch and display drivers 76 by selectively illuminating one segment of the circular visual directional display 26. Counter 80 generates antenna commutating switching signals and synchronous detector switching signals. A sweep display 82 derives signals from clock 72, dividers 74 and counters 80 to sequentially illuminate each segment of the segmented circular visual directional display 26 through a sweep signal control 90 when no radio frequency signal of sufficient strength is received by the FM receiver 20. The direction finding antenna array 22 which connects to the receiver antenna terminal of the frequency modulation receiver 20 is electronically switched by the antenna commutating switching signals from counters 80 and connects to the FM receiver 20 by way of coaxial transmission line 22a.

A narrow bandpass audio frequency filter 84 filters the audio output signals from an audio output terminal of the frequency modulation receiver 20. The frequency of filter 84 is equal to an output frequency produced by counter 80. The filtered signal has characteristics indicative of the direction of the originating source of the radio frequency signal received by the direction finding antenna array 22. A synchronous detector, buffer and chopper 86 processes the filtered audio signal from filter 84 by synchronously detecting the audio signal in two separate detectors, storing the synchronously detected signals, commutating the stored signals with signals from counters 80, and combining the commutated signals. A low pass filter 88 removes the harmonics of the combined (summed) commutated (chopped) signals yielding an A sin ωt+B cos ωt signal which is subsequently filtered to eliminate any high frequency components. The phase of this sine wave output signal of filter 88 is representative of the direction of arrival of the received radio frequency signal. A sweep signal control 90 detects the zero crossing of the sine wave signal and latches the latch in latch and display drivers 76 thereby selectively illuminating the segment of the circular segmented visual directional display 26 corresponding to the direction of arrival of the received radio frequency signal.

Figure 4A:
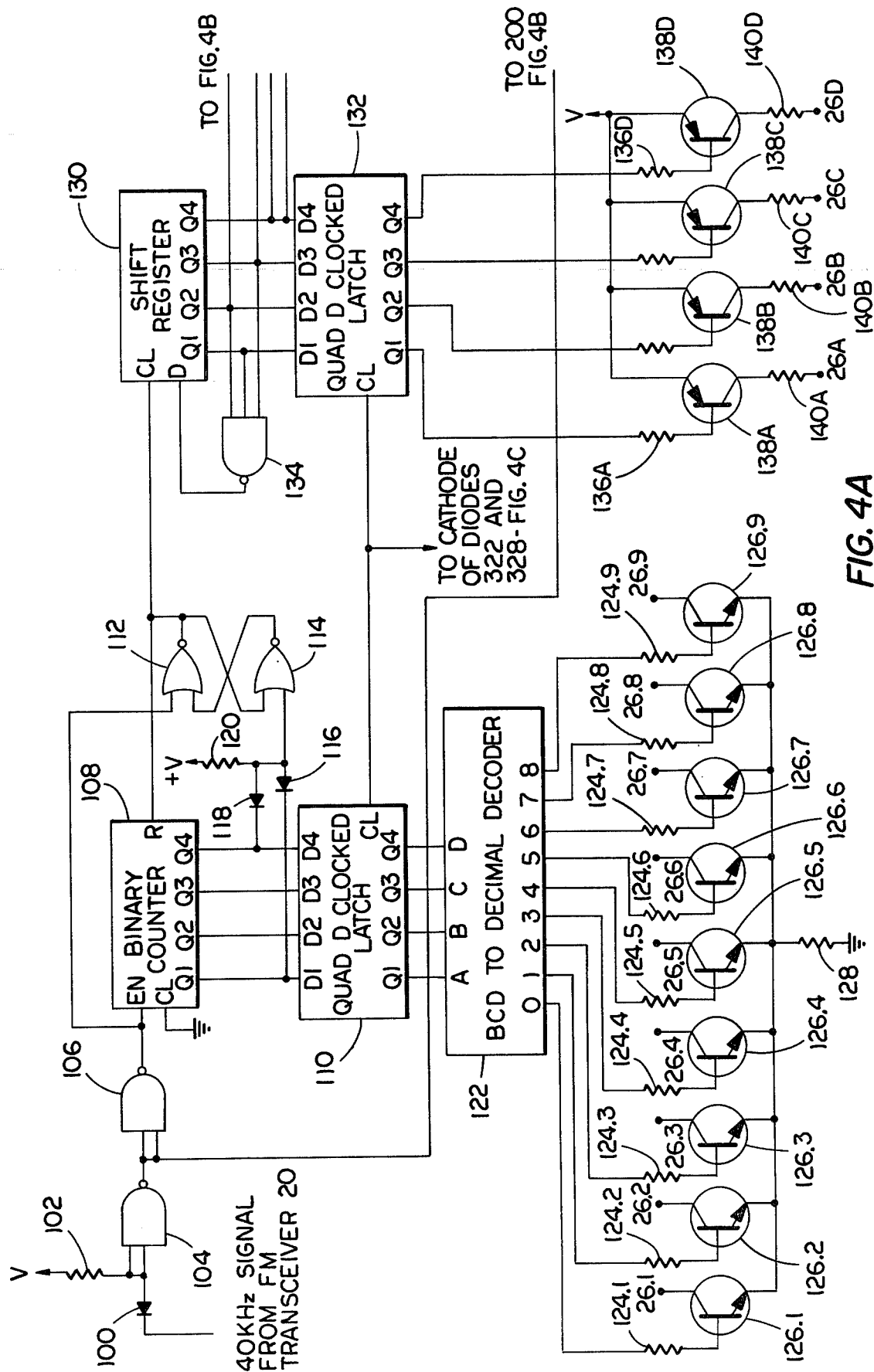

FIG. 3 illustrates a general physical sheet placement of the sheets of drawings of FIGS. 4A–4F which will assist coordinating these drawings. FIGS. 4A–4E illustrate an electrical circuit schematic of the ADF system signal processor 70 for utilization with the FM receiver 20 shown in FIGS. 1 and 2. FIG. 4F illustrates a top view of the physical spacing of the antennae of the direction finding antenna array of FIGS. 1, 2 and 4E.

FIG. 4A illustrates an electrical circuit schematic diagram of a portion of the ADF system signal processor 70 for utilization with an FM receiver 20. The diagram shows an input 40 kHz signal from the FM transceiver 20 of FIGS. 1 and 2 connected to the cathode of a supply isolation diode 100 in FIG. 4A. An oscillator could alternatively be used to generate the 40 kHz signal. A supply resistor 102 connects voltage source V to the junction of the anode of the diode 100 and the two inputs of NAND gate 104. Both inputs of a NAND gate 106 connect to the output of the NAND gate 104 and to the clock input of a dual D flip-flop 200 of FIG. 4B. An enable input of binary counter 108 and one input of NOR gate 112 connect to the output of NAND gate 106. D1-D4 inputs of quad D clocked latch 110 connect to the Q1-Q4 outputs of the binary counter 108. The cathode of diode 116 connects to the junction of the Q1 output of binary counter 108 and the D1 input of latch 110. The anode of diode 116 connects to one input of NOR gate 114.

The cathode of diode 118 connects to the junction of the Q4 output pof the binary counter 108 and the D4 input of latch 110. The anode of diode 118 connects to the junction of one input of NOR gate 114 and one end of supply resistor 120. The other end of supply resistor 120 connects to voltage source V. The other input of NOR gate 114 connects to the output of NOR gate 112. The other imput of NOR gate 112 connects to the output of NOR gate 114.

The A-D inputs of BCD-to-decimal decoder 122 connect to the Q1-Q4 outputs of quad D clocked latch 110. Base resistors 124.1-124.9 connect the 0-8 outputs of the BCD-to-decimal decoder 122 to the bases of PNP driver transistors 126.1-126.9 respectively. An emitter resistor 128 connects the emitters of transistors 124.1-124.9 to ground. The collectors of transistors 126.1-126.9 connect to the cathode connections 26.1-26.9 respectively of the thirty-six segment, light emitting diode circular directional display 26 of FIG. 4D. The clock input of a serial-input/parallel-output shift register 130 connects to the reset input of binary counter 108 and the output of NOR gate 112. The D1-D4 inputs of quad clocked D latch 132 connect to the Q1-Q4 outputs shift register 130. Inputs of NAND gate 134 connect to the junctions of Q1-D1, Q2-D2, and Q3-D3 of shift register 130 and quad clocked D latch 132, respectively. The output of the NAND gate 134 connects to the data input of the shift register 130. Base resistors 136A-136D connect between the bases of NPN driver transistors 138A-138D and the Q1-Q4 outputs of latch 132, respectively. Collector resistors 140A-140D connect between the collectors of the NPN transistors 136A-136D and the anode connections 26A-26D respectively of the thirty-six segment, light emitting diode circular directional display 26 of FIG. 4D. The clock inputs of latches 110 and 132 connect to the junction of the cathodes of diodes 322 and 328 of FIG. 4C.

Figure 4B:
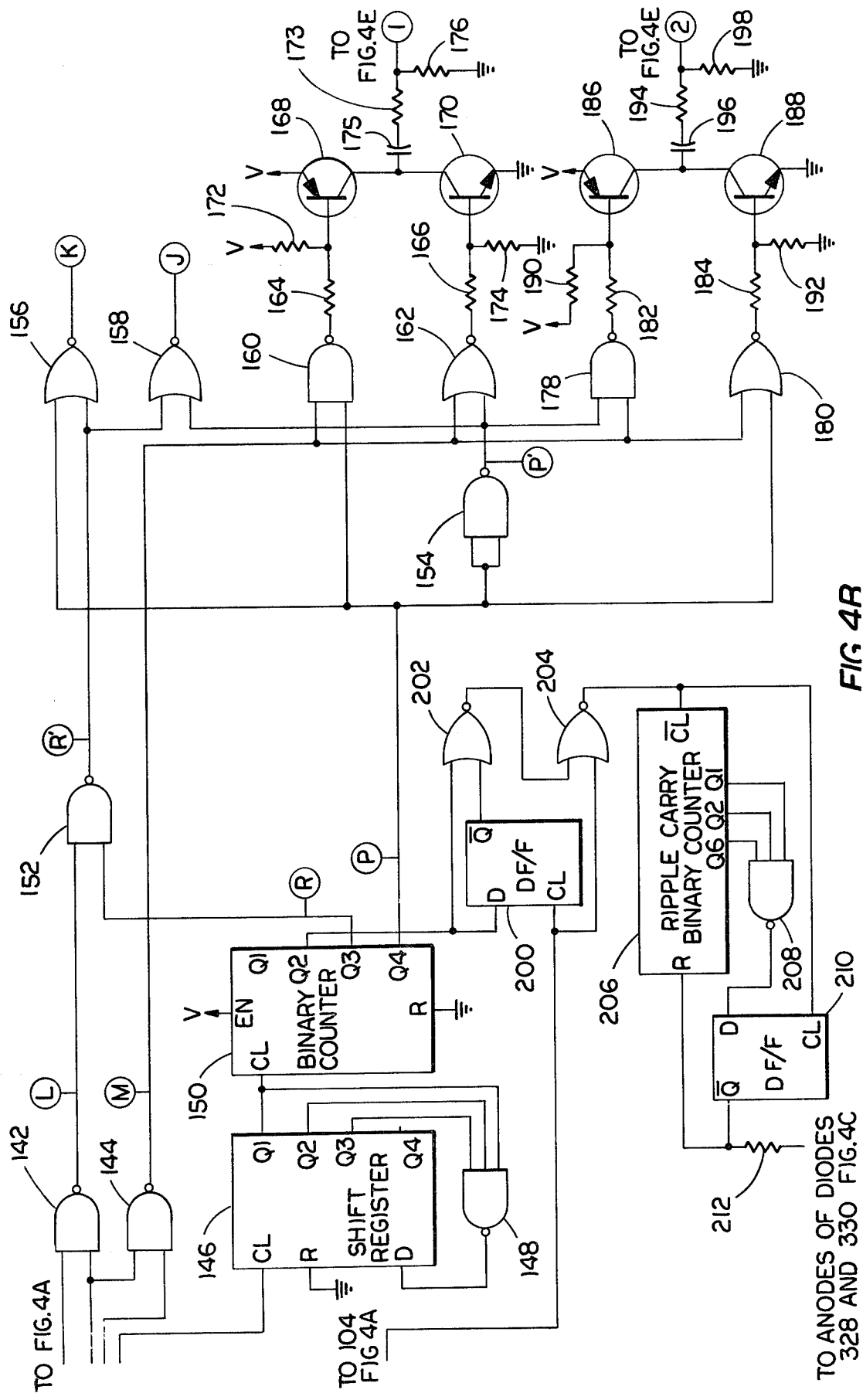

FIG. 4B illustrates two inputs of NAND gate 142 which connect to the outputs Q2 and Q3 of shift register 130 of FIG. 4A. NAND gate 142 produces a chopper switching signal L. Two inputs of NAND gate 144 connect to the outputs Q3 and Q4 of shift register 130 of FIG. 4A. NAND gate 144 produces a chopper switching signal M. A clock input of a serial-input, parallel-output shift register 146 connects to the Q4 output of shift register 130. The reset input of shift register 146 connects to ground. The Q1, Q2 and Q3 outputs of shift register 146 connect to the three inputs of NAND gate 148 whose output connects to the data input of shit register 146. The clock input of binary counter 150 connects to the Q1 output of shift register 146. The enable input of counter 150 connects to voltage source V. The reset input of counter 150 connects to ground. One input of NAND gate 152 connects to the output of NAND gate 142 and another input of the NAND gate 152 connects to the Q3 output of binary counter 150. Both inputs of NAND gate 154 connect to the Q4 output of binary counter 150.

Two inputs of NOR gate 156 connect to the output of the NAND gate 152 and the Q4 output of the binary counter 150 respectively. NAND gate 156 produces a synchronous detector switching signal K. Two inputs of NOR gate 158 connect to the outputs of NAND gates 152 and 154, respectively. NOR gate 158 produces a synchronous detector switching signal J. Two inputs of NAND gate 160 connect to the output of NAND gate 144 and to the Q4 output of binary counter 150. Two inputs of NOR gate 162 connect to the output of NAND gate 144 and to the output of NAND gate 154. Resistors 164 and 166 connect between the bases of NPN transistor 168 and PNP transistor 170 and the outputs of NAND gate 160 and NOR gate 162, respectively. A supply resistor 172 connects between the base of transistor 168 and voltage source V. Base resistor 174 connects between the base of transistor 170 and ground. One end of capacitor 175 connects to the collectors of the transistors 168 and 170. One end of resistor 173 connects to the other end of capacitor 175 and resistor 176 connects between the other end of resistor 173 and ground.

A first antenna commutating switching signal 1 is outputted at the junction of resistors 173 and 176. A second antenna commutating switching signal 2 is formed by the elements 178-198 connected in an identical configuration as elements 160-176 as previously described, except that the inputs derived from the Q4 output of binary counter 150 are inverted for the NAND gate 178 by NAND gate 154 and uninverted for the NOR gate 180. The data input of D flip-flop 200 connects to the Q2 output of binary counter 150. One input of NOR gate 202 connects to the Q output of flip-flop 200 and the other input of NOR gate 202 connects to the Q2 output of the binary counter 150.

One input of NOR gate 204 connects to the output of NOR gate 202 and the other input of NOR gate 204 connects to the output of NAND gate 104 (FIG. 4A). The inverted clock input of ripple carry binary counter 206 connects to the output of NOR gate 204. The three inputs of NAND gate 208 connect to the Q6, Q2, and Q1 outputs of the counter 206. The data input of flip-flop 210 connects to the output of the NAND gate 208 and the clock input of flip-flip 210 connects to the output of the NOR gate 204. The Q output of the D flip-flip 210 connects to the reset of the ripple carry binary counter 206. A resistor 212 connects between the Q output of the D flip-flop 210 and the anodes of diodes 328 and 330 of FIG. 4C.

Figure 4C:
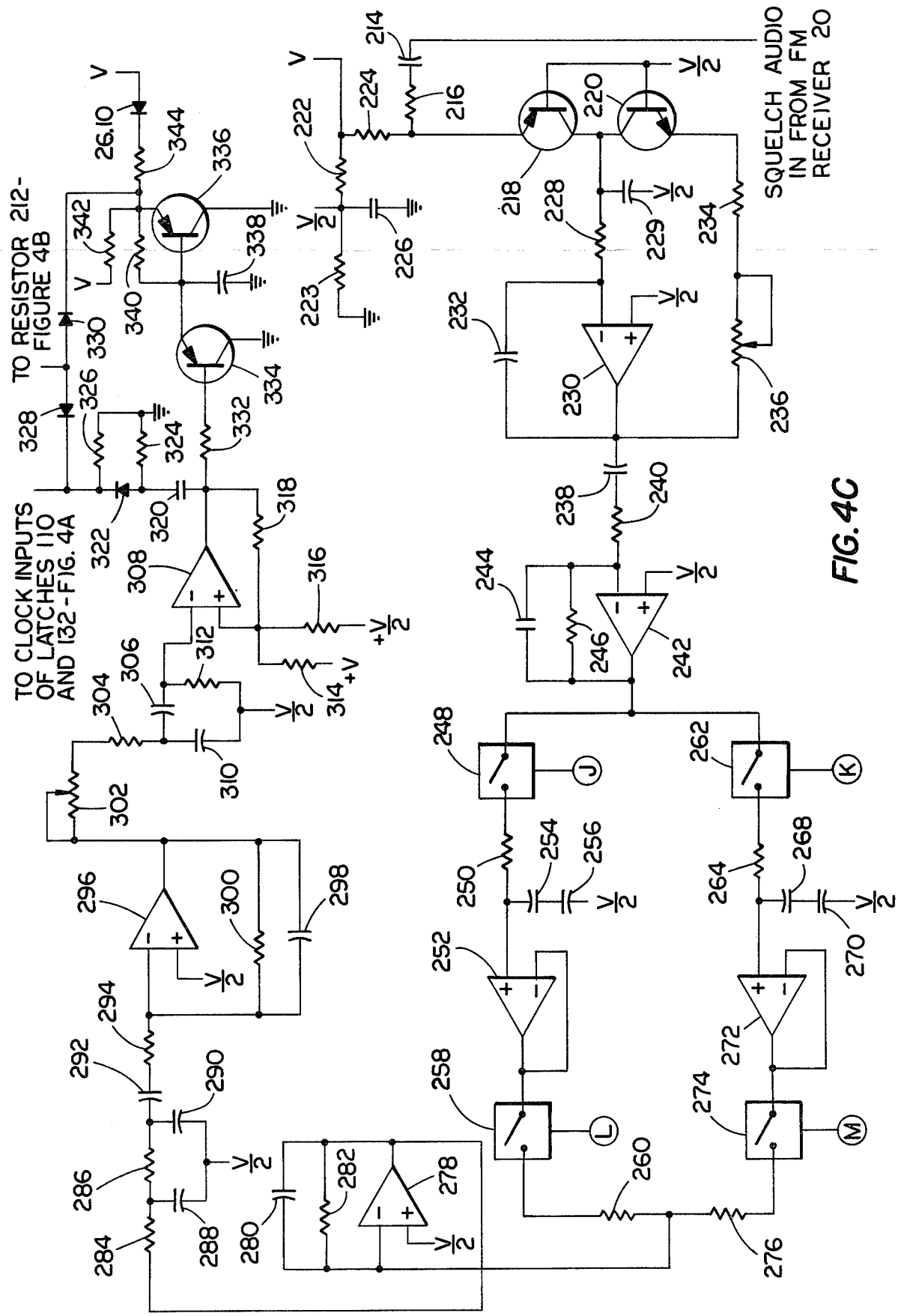

FIG. 4C illustrates a capacitor 214 in series with a resistor 216 which connects the audio output terminal (i.e. discriminator output) of the FM receiver 20 to the emitter of an NPN transistor 218. This connects the audio signal to the ADF system signal processor 70 from the FM receiver 20. The bases of a PNP transistor 220 and NPN transistor 218 connect to voltage source V/2, one-half of the potential of the voltage source V. Importantly, this voltage source V/2 serves as AC ground for most of the circuit of FIG. 4C, and provides a reference for comparison of readily obtained relatively higher and lower voltages (for, as an example, positive and negative vector values). Resistors 222 and 223 in series connect between voltage source V and ground to provide voltage source V/2. Resistor 224 connects between voltage source V and the emitter of transistor 218. A filter capacitor 226 connects between ground and the junction of the resistors 222 and 223. A resistor 228 connects between an inverting input of an operational amplifier 230 and the junction of the emitters of transistors 218 and 220. A capacitor 229 connects between the junction of the emitters of transistors 218 and 220, and voltage source V/2. The non-inverting input of operational amplifier 230 connects to voltage source V/2. A capacitor 232 connects between the output and the inverting input of operational amplifier 230. A resistor 234 in series with a variable resistor 236 connects between the emitter of transistor 220 and the output of operational amplifier 230. A capacitor 238 in series with a resistor 240 connects between the inverting input of an operational amplifier 242 and the output of operational amplifier 230. The non-inverting input of operational amplifier 242 connects to voltage source V/2. A capacitor 244 in parallel with a resistor 246 connects between the inverting input and the output of operational amplifier 242.

The inputs of CMOS bilateral switches 248 and 262 connect to the output of operational amplifier 242. A resistor 250 connects the output of the bilateral switch 248 to a non-inverting input of an FET input operational amplifier 252. Synchronous detector signal J from the output of NOR gate 158 of FIG. 4B connects to the control of the bilateral switch 248. Two oppositely polarized tantalum capacitors 254 and 256 are connected in series between the non-inverting input of FET input operational amplifier 252 and voltage source V/2 to store a direct current signal which is representative of two vectors. The input of a bilateral switch 258 connects to the output of operational amplifier 252. A resistor 260 connects the output of bilateral switch 258 to an inverting input of an operational amplifier 278. Chopper switching signal L from the output of the NAND gate 142 of FIG. 4B connects to the control of the CMOS bilateral switch 258. Elements 262-276 connect in an identical electrical schematic configuration as elements 248-260 as previously described and are switched by synchronous detector switching signal K and chopper switching signal M. The inverting input of an operational amplifier 278 connects to the junction of resistors 260 and 276. The non-inverting input of operational amplifier 278 connects to voltage source V/2. A capacitor 280 in parallel with a resistor 282 connects between the output and the inverting input of operational amplifier 278. A series connection of a resistor 284, a resistor 286, a capacitor 292 and a resistor 294 connect between the output of the operational amplifier 278 and the inverting input of an operational amplifier 296, respectively. Capacitors 288 and 290 connect between both junctions of resistor 286 and voltage source V/2. The non-inverting input of the operational amplifier connects to voltage source V/2. A capacitor 298 and a resistor 300 in parallel connect between the output and the inverting input of operational amplifier 296. A series connection of a variable resistor 302, a resistor 304, and a capacitor 306, connect between the output of operational amplifier 296 and an inverting input of an operational amplifier 308. A capacitor 310 connects between the junction of resistor 304 and capacitor 306 and voltage source V/2. A resistor 312 connects between the inverting input of operational amplifier 308 and voltage source V/2. Resistor 314 (475 kilohm) connects between the non-inverting input of operational amplifier 308 and voltage source V. Resistor 316 (10 kilohm) connects between the non-inverting input of operational amplifier 308 and voltage source V/2. A resistor 318 (475 kilohm) connects between the output and the non-inverting input of operational amplifier 308. A capacitor 320 connects between the anode of diode 322 and the output of the operational amplifier 308. The junction of the cathodes of diodes 328 and 322 connects to the clock inputs of latches 110 and 132 of FIG. 4A. The junction of the anodes of diodes 328 and 330 connects to resistor 212 of FIG. 4B. Resistors 324 and 326 connect between both junctions of diode 322 and ground. A resistor 332 connects the base of an NPN transistor 334 to the output of operational amplifier 308. The base of an NPN transistor 336 connects to the emitter of transistor 334. A polarized electrolytic capacitor 338 connects between the emitter of transistor 334 and ground. A resistor 340 connects the emiter to the base of transistor 336. A resistor 342 connects the emiter of transistor 336 to voltage source V. The collectors of transistors 334 and 336 connect to ground. The cathode of diode 330 connects to the emitter of transistor 336. A resistor 344 connects between the emitter of transistor 336 and the cathode of a center light emitting diode 26.10 of the thirty-six segment circular visual directional display 26 and the anode of diode 26.10 connects to voltage source V.

Figure 4D:
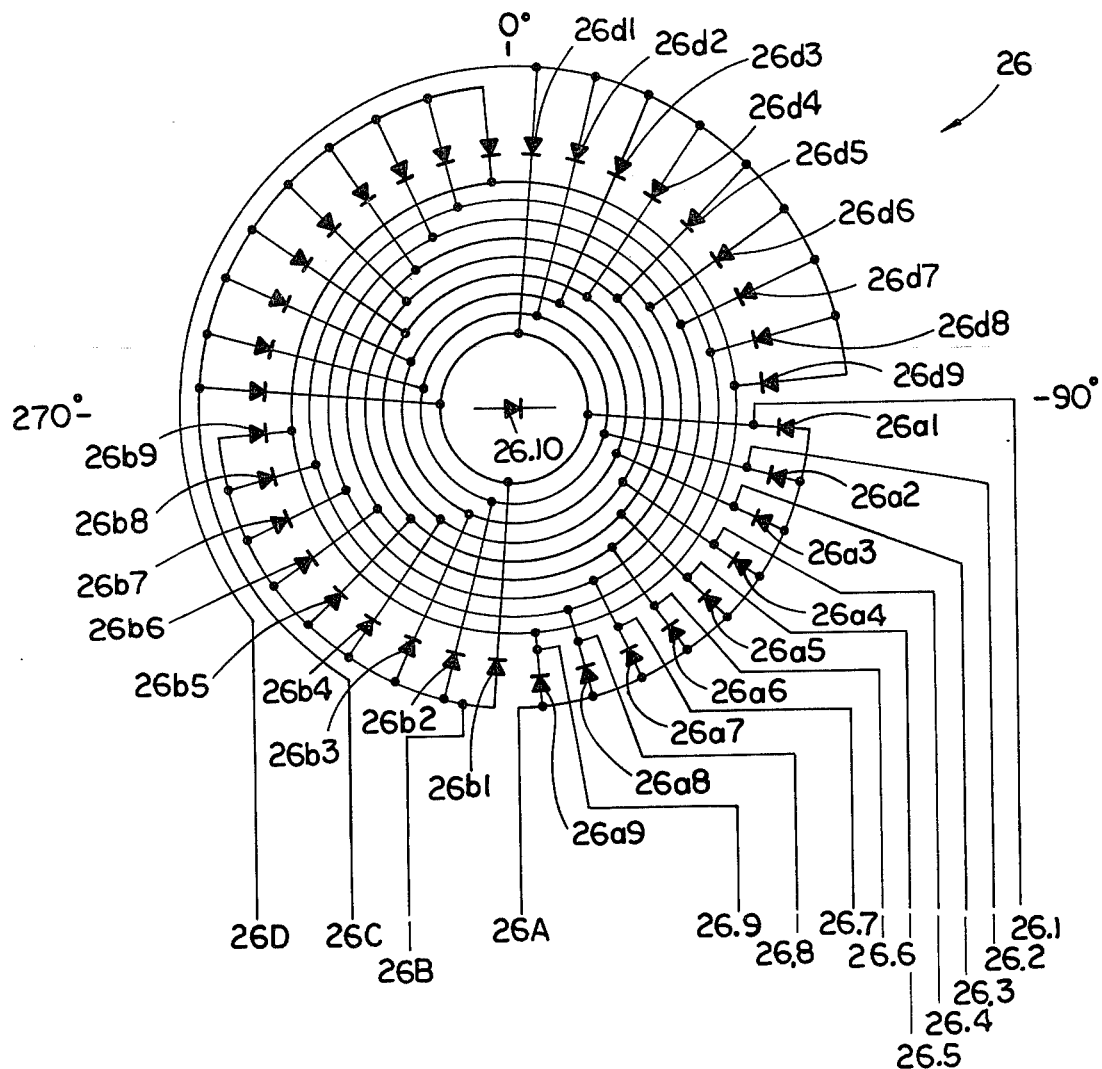

FIG. 4D illustrates the thirty-six segment circular visual directional display 26 which comprises thirty-six light emitting diodes 26A1 to 26A9, 26B1 to 26B9, 26C1 to 26C9 and 26D1 to 26D9, inclusive. These thirty-six diodes are connected in a 9×4 electrical matrix configuration. The diodes are arranged on the circumference of a circle for clockwise viewing order. Diode cathode leads 26.1 to 26.9 connect to the collectors of the driver transistors 126.1 to 126.9 of FIG. 4A. Diode anode leads 26A to 26D connect to collector resistors 140A to 140D of FIG. 4A. The circular display 26 lends itself to the illustrated physical and electrical circular layout of the diodes and associated conductors on a printed circuit board with diode 26.10 positioned in the center of the circular array. Illumination of the center diode 26.10 indicates that the audio signal is being processed by the ADF system signal processor 70. Selective illumination of a segment of the circular visual directional display 26 while the center diode 26.10 is illuminated indicates the direction of arrival of a radio frequency signal received by the direction finding antenna array 22.

FIG. 4E illustrates the electrical circuit of the direction finding antenna array 22 which connects to the antenna input terminal of the FM receiver 20 by way of coaxial cable 22a. While the description illustrates the preferred embodiment in which the array 22 is used to receive vertically polarized rf signals and is positioned to determine direction in a horizontal plane, other arrangements as would occur to a person of ordinary skill are also contemplated. The four dipole antennas 40-46 are supported by the center insulators 48-54. Horizontal support members 56-62 support and space the dipole center insulators 48-54 from the mast center insulator 64 on the mast 66. The dipole antennas 40-46 are each vertically oriented. The alignment of a first pair of antennas 40 and 42 is in a plane which is at right angles to the plane of the other pair of antennas 44 and 46. Each antenna within a pair is separated the other antenna by between about one-eight wavelength but not more than one-half wavelength. In the preferred embodiment, each antenna of one pair is separated from the antennas of the other pair by one-eighth wavelength and each pair is orthogonally positioned with respect to the other as illustrated in FIG. 4F. Alternatively from that which is illustrated, the same dipole could function as an antenna in each pair, allowing for a three antenna array with similar properties.

In the preferred embodiment, first and second antenna commutating signals 1 and 2 from resistors 173 and 194 of FIG. 4B connect to inductors 352 and 354, respectively. The cathode of a first PIN antenna switching diode 356 connects to inductor 352 and the anode of the diode 356 connects through matching transformer 358 to ground. The first antenna 40 connects to the other side of the matching transformer 358. The anode of a second PIN antenna switching diode 360 connects to inductor 352 and the cathode of the diode 360 connects to through matching transformer 362 to ground. The second antenna 42 connects to the other side of matching transformer 362. A capacitor 364 connects the junction of inductor 352 and diodes 356 and 360 to the inner conductor of the coaxial cable 22a. Antennas 40 and 42 comprise the first pair of antennas. Likewise, diodes 366 and 370, matching transformers 368 and 372, capacitor 374 and the inner conductor of the coaxial cable 22a connect in an identical electrical configuration to the third antenna 44 and the fourth antenna 46, which constitute the second pair of antennas.

FIG. 4F illustrates a top view of the physical spacing of the first pair of antennas 40 and 42 of the direction finding antenna array 22, and the second pair of antennas 44 and 46 of the direction finding antenna array. The antennas 40–46 are positioned on the corners of a square where each side of the square is one-eight wavelength.

Figure 5A:
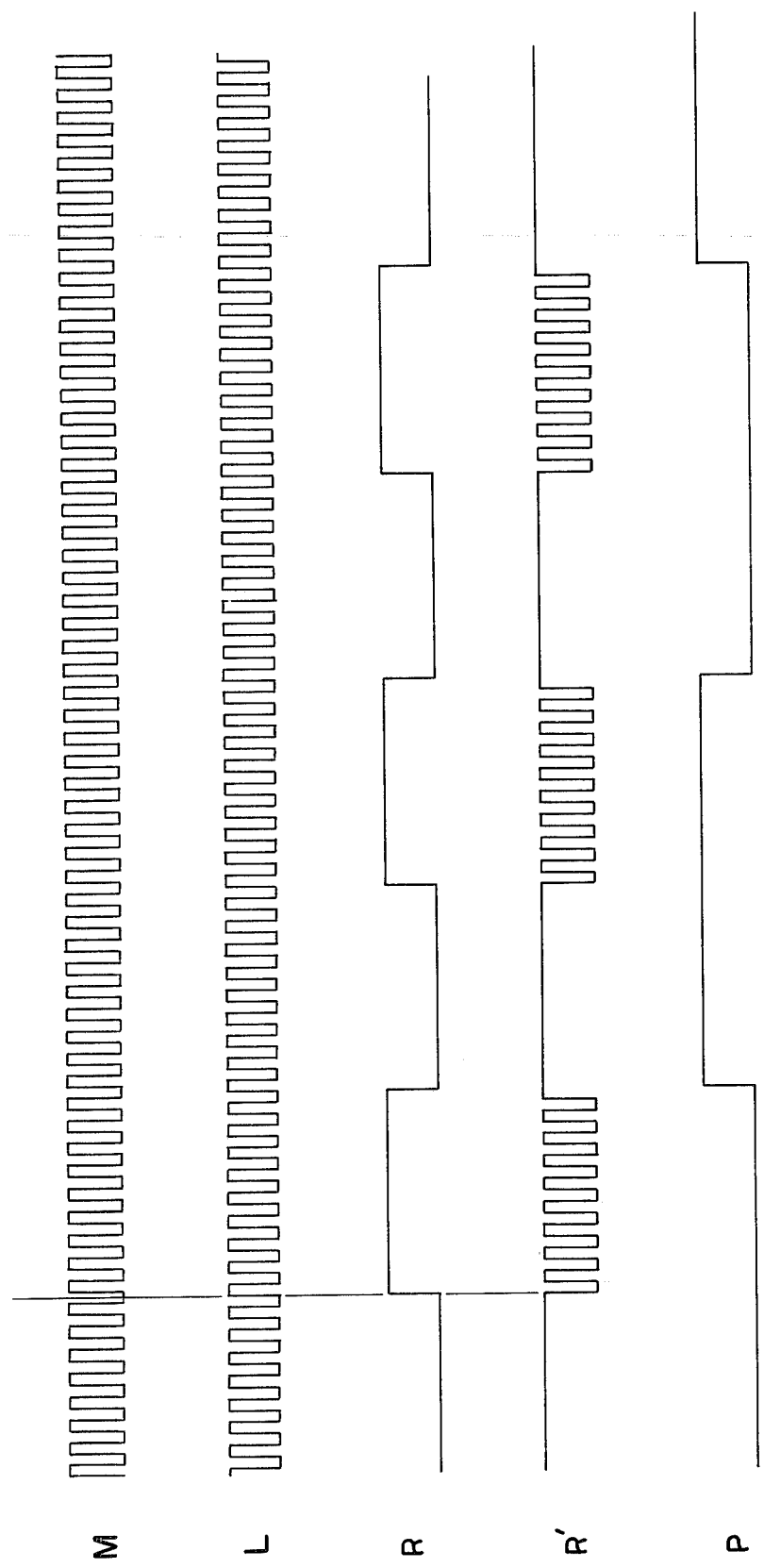
FIGS. 5A–5C illustrate the timing diagrams of some signals of the ADF system of FIG. 1.
Figure 5B:
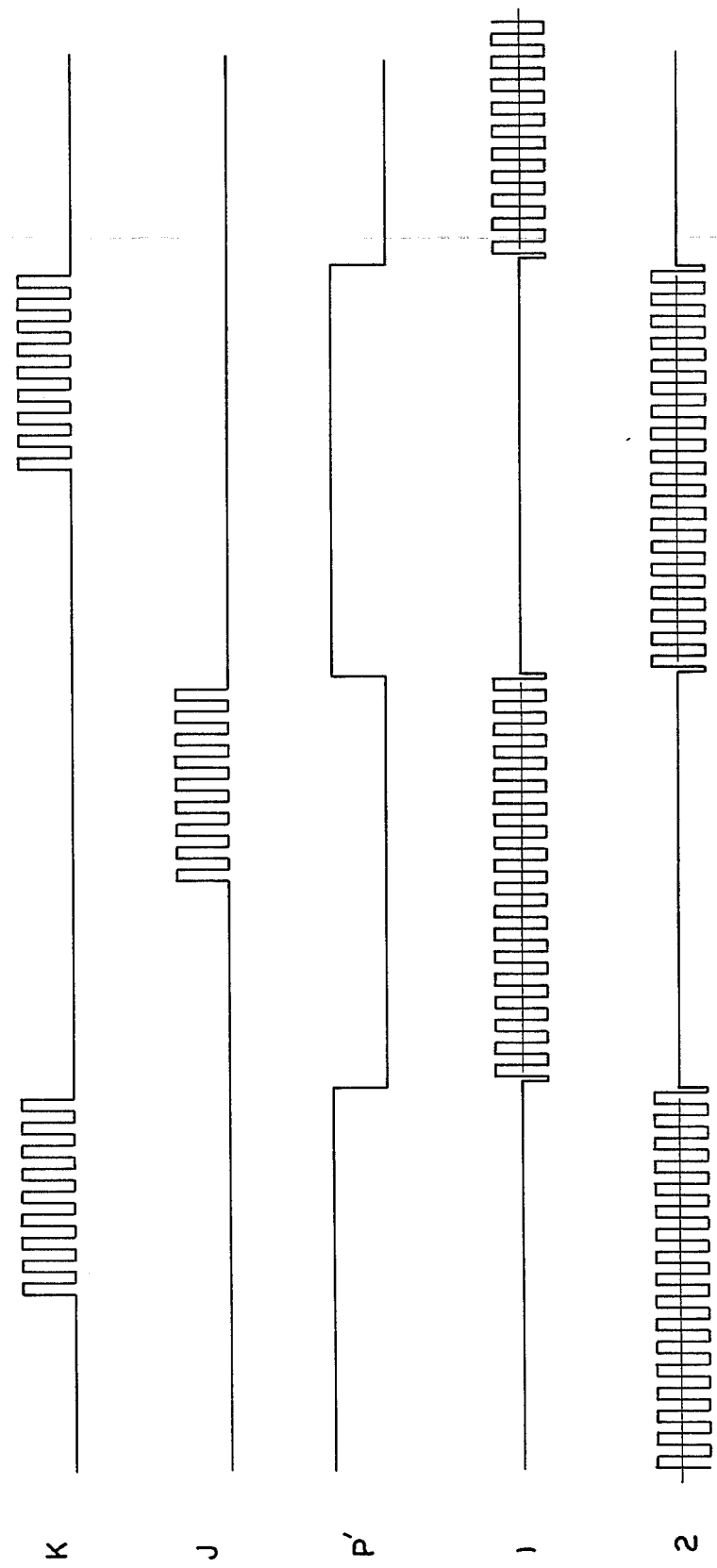
Figure 5C:
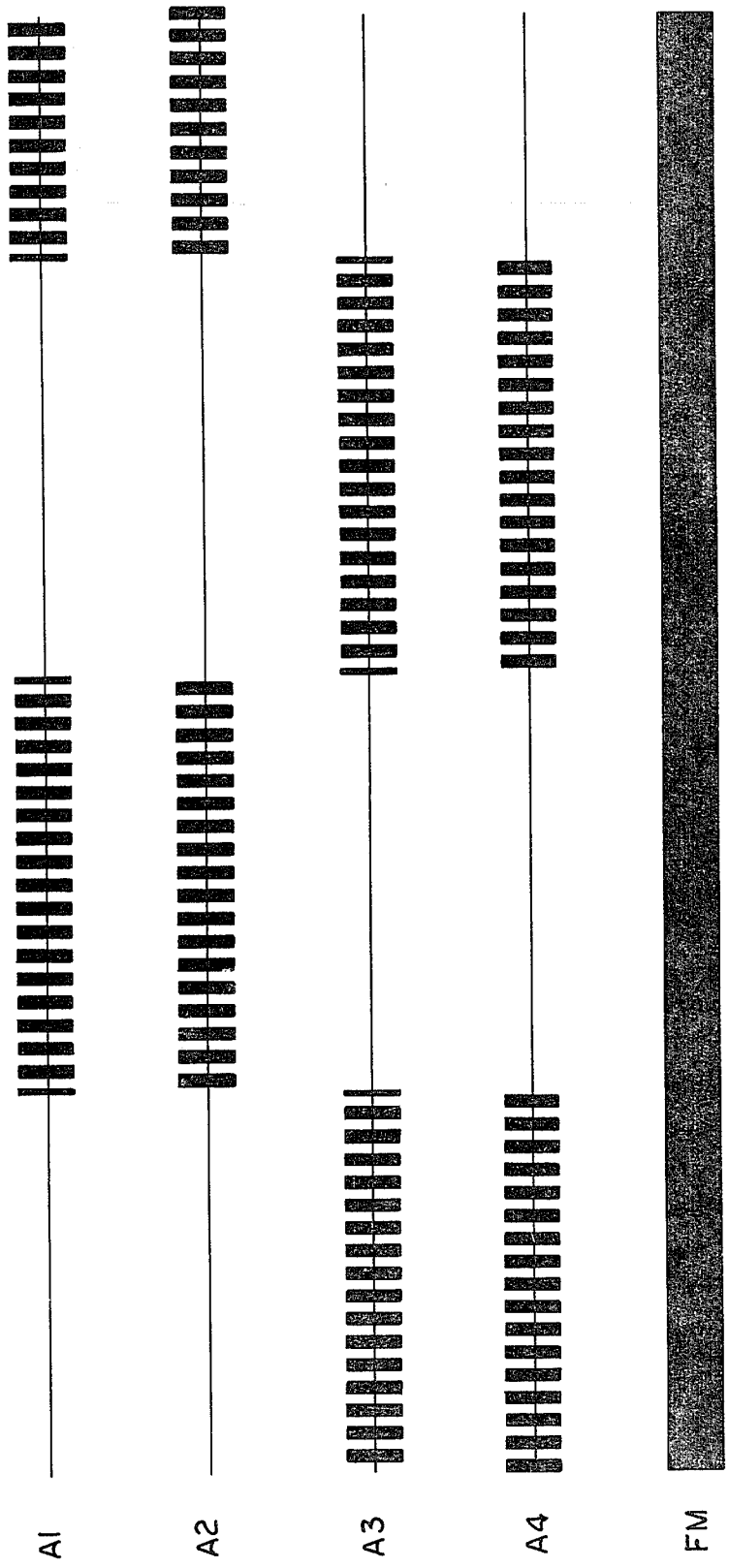

FIGS. 5A–5C illustrate the switching waveform timing signals of the ADF system signal processor 70 for the FM receiver 20.

FIG. 5A illustrates the L and M 1.11 kHz chopper switching signals outputted by the NAND gates 144 and 142 respectively of FIG. 4B where chopper switching signal M leads chopper switching signal L by ninety degrees. The R and R' switching signals are outputted by the Q3 output of binary counter 150 and by NAND gate 152, respectively, of FIG. 4B. The P switching signal having a frequency of 17.36 Hertz is outputted at the Q4 output of binary counter 150.

FIG. 5B illustrates the K and J synchronous detector switching signals outputted by the NOR gates 156 and 158 respectively of FIG. 4B. The J and K synchronous detector switching signals have a frequency of 1.11 kHz and are alternately switched during the high R signal. The P' switching signal having a frequency of 17.36 Hertz and being one hundred and eighty degrees out of phase with the P signal is outputted at the NAND gate 154 of FIG. 4 B. The antenna commutating switching signals 1 and 2 outputted by the switching transistors 168 and 170 and 186 and 188 of FIG. 4B are 1.11 kHz signals switched during the high P and P' signals respectively.

FIG. 5C illustrates the radio frequency signals received by the four switched antennas 48–54 of FIG. 4E and the resultant summed phase modulated radio frequency signal connected to the antenna input terminal of the frequency modulation receiver 20 through the coaxial cable transmission line 22a. Antennas 48 and 50, the first pair of antennas of FIG. 4E, are alternately switched at 1.11 kHz during the first antenna commutating switching signal 1 and producing signals A1 and A2. Antennas 52 and 54, the second pair of antennas FIG. 4E, are alternately switched at 1.11 kHz during the second antenna commutating switching signal and producing signals A3 and A4. The resultant summation radio frequency signal of four antenna signals is the summed radio frequency signal "FM" as illustrated in FIG. 5C. In view of the disclosed FM receiver, it is presumed that the signal of interest will be an FM signal. In any event, the summed signal will include a phase modulated component within the audio bandpass of the receiver, as a result of the 1.11 kHz commutating of the spaced antennas.

FIG. 6 illustrates a perspective view of another of the preferred embodiments of the automatic direction finding system. An amplitude modulated (AM) Citizens Radio Service (CB) transceiver 400 having the receiver antenna terminal connected to a direction finding antenna array 402 comprising loop antennas 428 and 430 on the lower portion of the direction finding antenna array 402 and a sense antenna 406 on the upper portion of the direction finding antenna array 402. A thirty-six segment circular visual directional display 408, a volume on-off control 410, a squelch control 412, a speaker 414, a channel selector 416 and a channel indicator 418 are positioned as illustrated on the front panel 420 of the AM CB transceiver 400.

The direction finding antenna array 402 comprises a hollow longitudinal mast support 422 physically supporting and spacing a conductive support member 424 from an upper insulator 426. Mast support 422 serves as the lower portion of the sense antenna 406. The sense antenna 406 can also be utilized as a transmitting antenna and is provided with a loading coil 406a which affixes to the base of the whip of the sense antenna 406. A first loop antenna 428 supported between the conductive support member 424 and insulator 426 is orthogonally positioned with respect to a second loop antenna 430 mechanically and electrically identical to the first loop antenna 428 (and also supported between the conductive support 424 and insulator 426). Three coaxial transmission lines connect the direction finding antenna array 402 to the AM CB transceiver 400. Specifically, two coaxial cable transmission lines 432a and 432b connect the first and second loop antennas 428 and 430 to the ADF system of FIG. 9E in the AM CB transceiver 400 as later described and the third coaxial cable transmission line 432c connects the sense antenna 406 to the ADF system of FIG. 9F in the AM CB transceiver 400 as later described.

FIG. 6A illustrates a vertical sectional view of first loop antenna 428 affixed between insulators 424 and 426. First loop antenna 428 comprises a right U-shaped hollow conducting tubular member 428a and a left U-shaped hollow conducting tubular member 428b affixed between and supported by insulator 426 and conductive support member 424. A continuous length of insulated wire 428c runs internal to the hollow tubular members 428a and 428b through the upper insulator 426 and connects to the secondary 429f of a matching transformer 428d. The tubular members 428a and 428b are grounded to the shields of the coaxial cables 432 at the support member 424. Coaxial cable 432c which connects to sense antenna 406 is adjusted to a different length than coaxial cables 432a and 432b to achieve a proper phase correlation. A tuning capacitor 428g connects across the primary winding 428f of matching transformer 428d to provide resonance of the loop at the predetermined frequency of operation. The secondary winding 428e of the transformer 428d connects to the junctions of the cathodes of the diodes 754 and 756 of FIG. 9E. The turns ratio of the secondary winding 428e to the primary winding 428f of the matching transformer 428d is predetermined to provide the proper bandwidth for the loop antenna 428 and proper impedance matching. By way of example and for purposes of illustration only, the turns ratio for the matching transformer 428d is one to eight for the 27 MHz frequencies. The second loop 430 is mechanically and electrically identical in structure and elements to the first loop 428, and is orthogonally positioned with respect to the first loop 428. The second loop 430 electrically connects through the matching transformer 430d (not illustrated) to the junctions of the cathodes of the diodes 762 and 764 of FIG. 9E.

Figure 7:
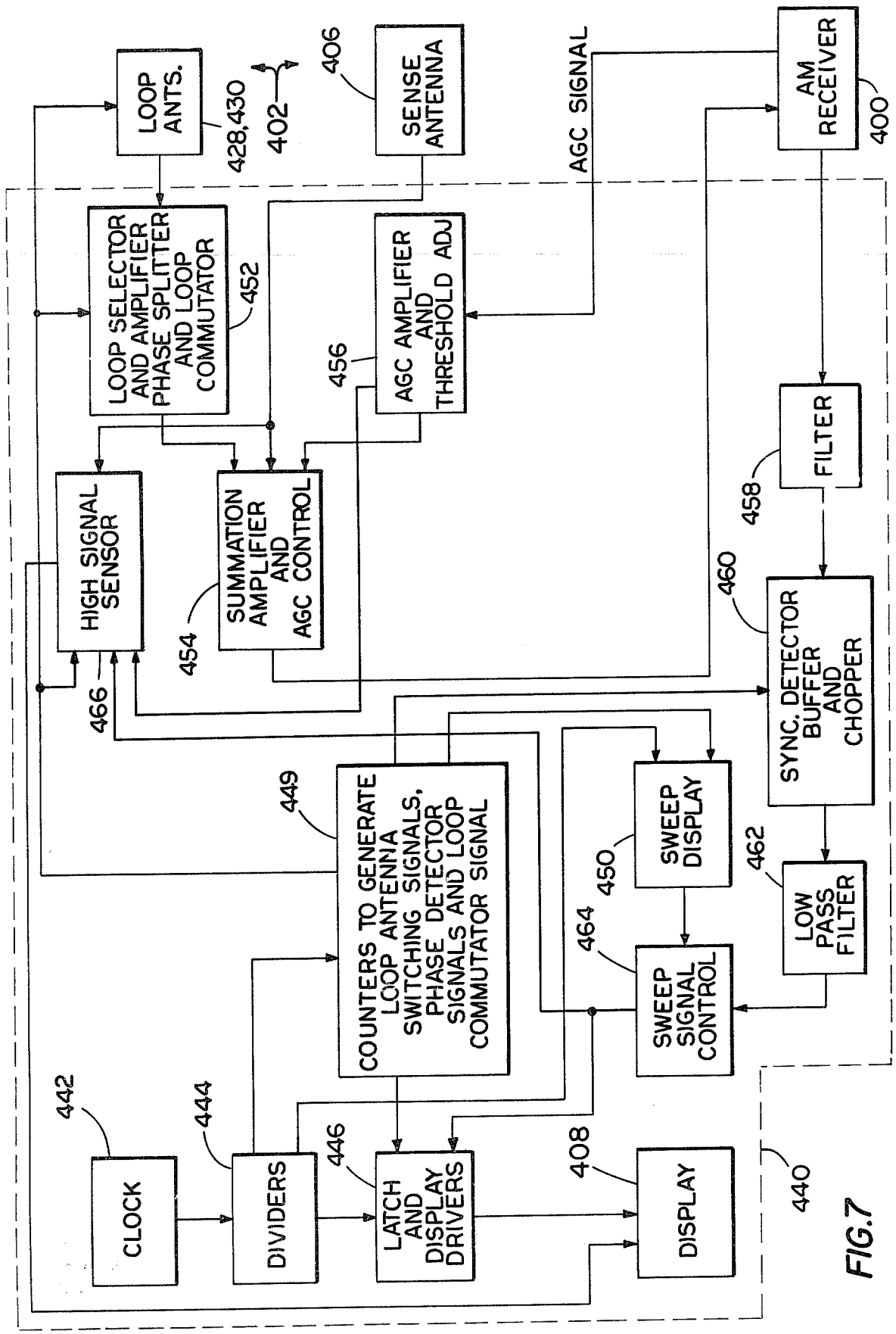
FIG. 7 illustrates a block diagram of the automatic direction finding system for utilization with the amplitude modulation receiver of FIG. 6.

FIG. 7 illustrates a block diagram of the preferred ADF system which includes an AM receiver. The ADF system signal processor 440 is shown within the dashed line of the figure and is connected to AM receiver 400 and direction finding antenna array 402. A clock 442 generates a source of frequency which is divided by dividers 444. Latch and display drivers 446 operate to retain and produce at their output a selected binary count from the output of the dividers 444. The segmented circular visual directional display 408 displays the decoded retained count at the output of the latch and display drivers 446 by selectively illuminating one segment of the circular visual directional display 408. Counter 449 generates loop antenna commutating switching signals, synchronous detector switching signals, and a loop commutating switching signal. A sweep display 450 derives signals from clock 442 and counters 449 to sequentially illuminate each segment of the circular visual directional display 408 through a sweep signal control 464 when no radio frequency signal of sufficient strength is received by the AM receiver 400. The loop antennas 428 and 430 of direction finding antenna array 402 are switched by the loop antenna commutating switching signals from the counters 449. Switching signals from counters 449 electronically switch between the loop antennas by a loop selector and amplifier, phase splitter and loop commutator 452. The received signal is subsequently electronically commutated by loop commutator 452.

A summation amplifier and automatic gain control (AGC) 454 is controlled by a threshold adjusted automatic gain control signal 456 operating on the AGC signal from the AM receiver 400. This circuit sums the radio frequency signals from the sense antenna 406 (about 80% of total) and from the loop commutator 452 (about 20% of total). The output of the summation amplifier and AGC control 454 connects to the receiver antenna terminal.

A narrow bandpass audio frequency filter 458 filters the audio output signal from an audio output terminal of the AM receiver 400. The frequency of filter 458 is equal to an output frequency of the counters 449. The filtered signal has characteristics indicative of the direction of the originating source of the radio frequency signal received by the direction finding antenna array 404. A synchronous detector, buffer and chopper 460 processes the filtered audio signal from filter 458 by synchronously detecting the audio signal in two separate detectors, storing the synchronously detected signals, commutating the stored signals with signals from counters 449, and combining the commutated signals. A low pass filter 462 integrates the combined (summed) commutated (chopped) signal yielding a $A \sin \omega t + B \cos \omega t$ signal which is subsequently filtered to eliminate any high frequency components. The phase of this sine wave output signal of filter 462 is representative of the direction of arrival of the received radio frequency signal. A sweep signal control 464 detects the zero crossing of the sine wave signal and latches the latch in latch and display drivers 446 thereby selectively illuminating the segment of the circular segmented visual directional display 408 corresponding to the direction of arrival of the received radio frequency signal.

Figure 8:
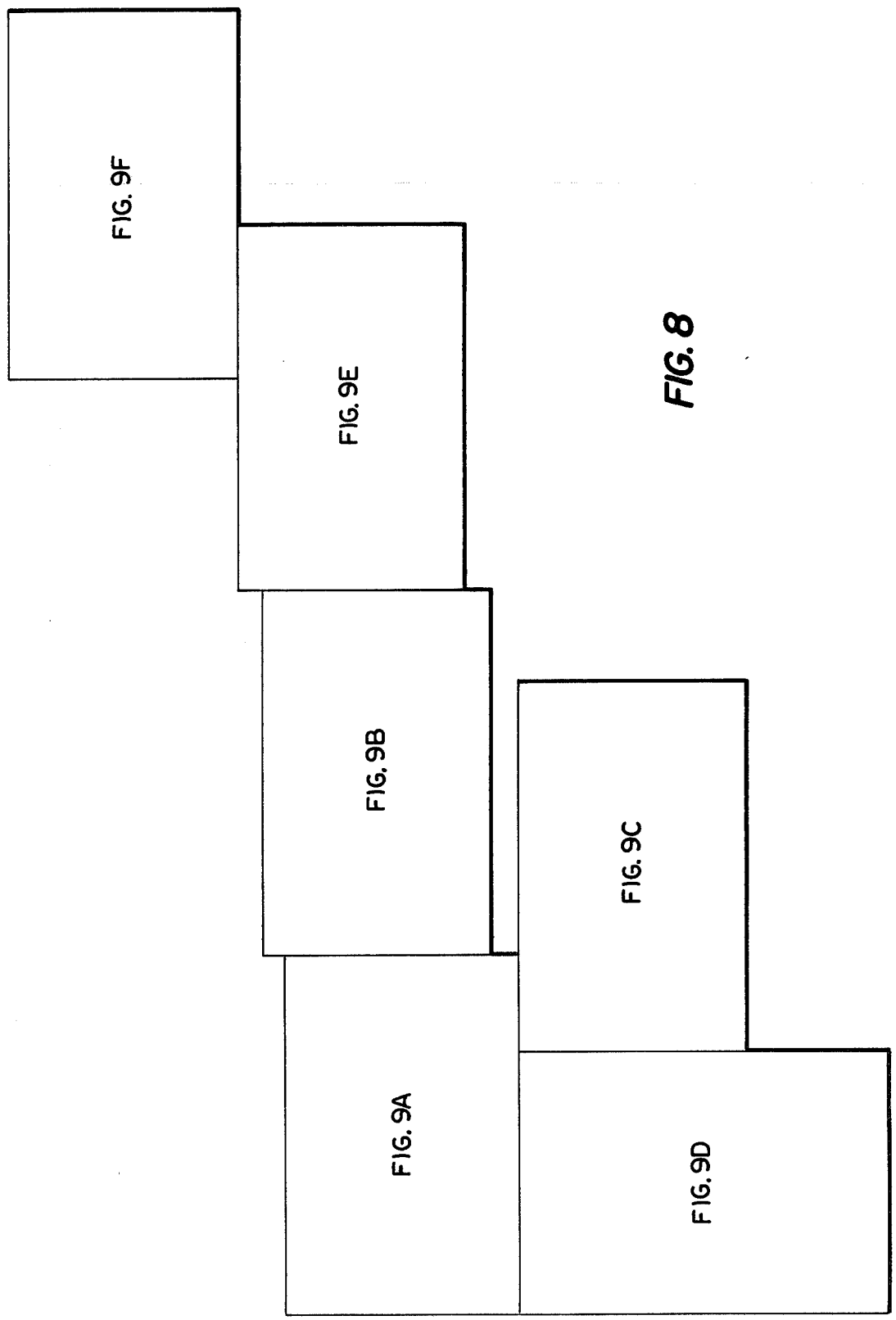
FIG. 8 illustrates the placement of the sheets of the drawings of FIGS. 9A–9F.

FIG. 8 illustrates a general physical sheet placement of the sheets of drawings of FIGS. 9A–9F which will assist coordinating these drawings. FIGS. 9A–9F illustrate an electrical circuit schematic diagram of the ADF system signal processor 440 for utilization with the AM receiver 400 shown in FIGS. 6 and 7.

Figure 9A:
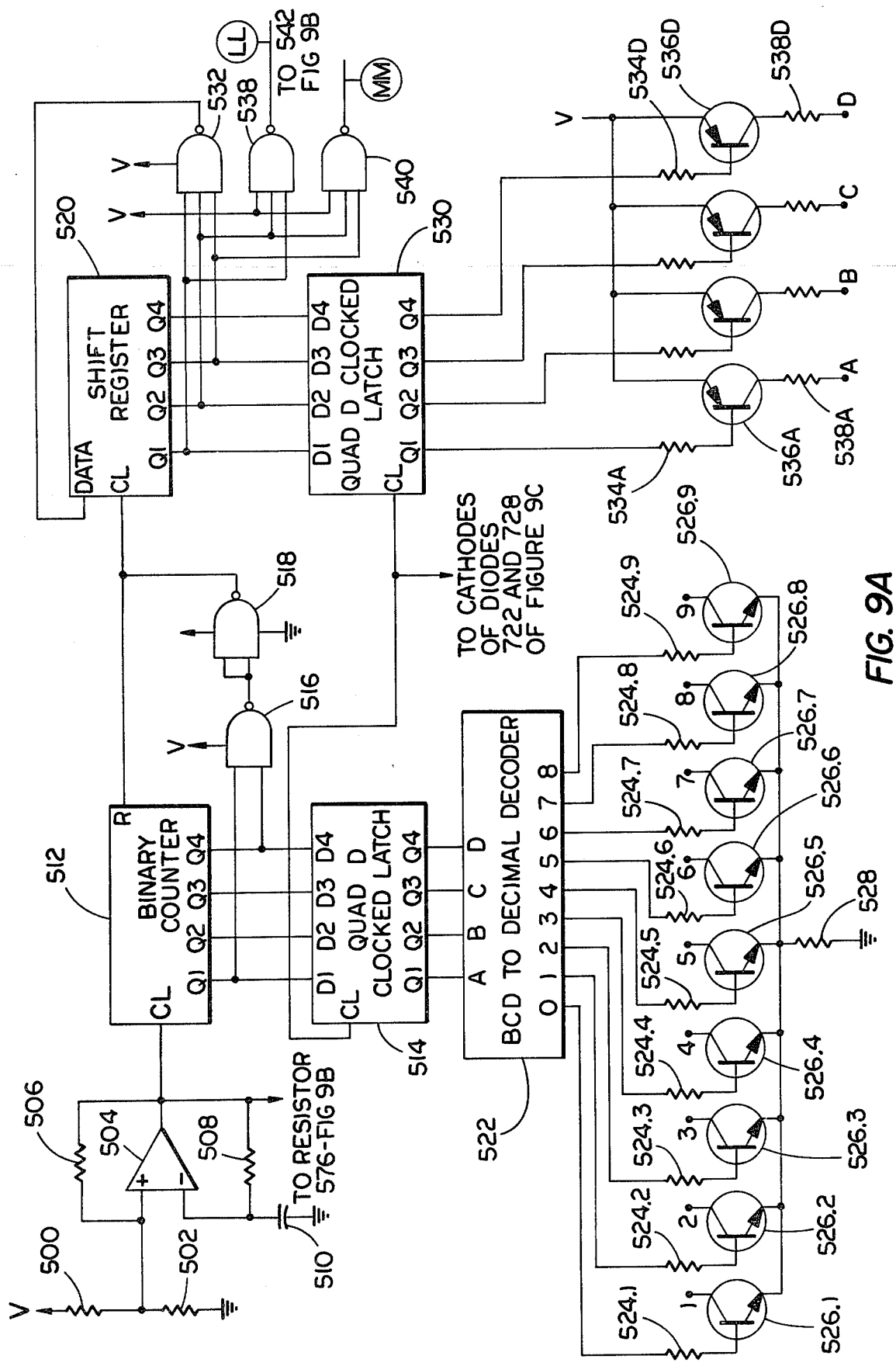
FIGS. 9A–9F illustrate the electrical circuit schematic diagram of the ADF system of the FIG. 6.

FIG. 9A illustrates a resistor 500 and a resistor 502 connected between voltage source V and ground, respectively, to the non-inverting input of operational amplifier 504. Resistors 506 and 508 connect between the output of operational amplifier 504 to the non-inverting input and to the inverting input, respectively, of operational amplifier 504. A capacitor 510 connects between the inverting input of operational amplifier 504 and ground. The clock input of a four bit binary counter 512 connects to the output of operational amplifier 504. The D1–D4 inputs of a quad D clocked latch 514 connect to the Q1–Q4 outputs of the counter 512. Inputs of a NAND gate 516 connect to the outputs Q1 and Q4 of the counter 512. Inputs of a NAND gate 518 connect to the output of NAND gate 516. The output of NAND gate 518 connects to the reset input of the counter 512 and to the clock input of a serial-input, parallel output shift register 520. The A–D inputs of a BCD-to-decimal decoder 522 connect to the Q1–Q4 outputs of the quad D clocked latch 514. Base resistors 524.1–524.9 connect the 0-8 outputs of the binary coded decimal decoder 522 to the bases of PNP driver transistors 526.1–526.9, respectively. An emitter resistor 528 connects the emitters of transistors 526.1–526.9 to ground. The collectors 1-9 of the transistors 526.1–526.9 connect to the cathode connections 408.1–408.9, respectively, of the thirty-six segment circular visual light emitting diode display directional display 408 of FIG. 9D.

The clock input of serial-input, parallel-output shift register 520 connects to the output of NAND gate 518 as previously described. The D1–D4 inputs of quad D clocked latch 530 connect to the Q1–Q4 outputs of shift register 520. Inputs of a NAND gate 532 connect to the Q1, Q2, and Q3 outputs of shift register 520. The output of the NAND gate 532 connects to the data input of shift register 520. Base resistors 534A–534D connect between the bases of NPN transistors 536A–536D and the Q1–Q4 outputs of latch 530, respectively. The emitters of transistors 536A–536D connect to voltage source V. Collector resistors 538A–538D connect between the collectors of the transistors 536A–536D and the anode connections 408A–408D, respectivel,y of the thirty-six segment circular visual light emitting diode directional display 408 of FIG. 9D. The NAND gates 538 and 540 output chopper switching signals LL and MM derived from Q1 and Q2 and from Q2 and Q3 of shift register 520, respectively.

Figure 9B:
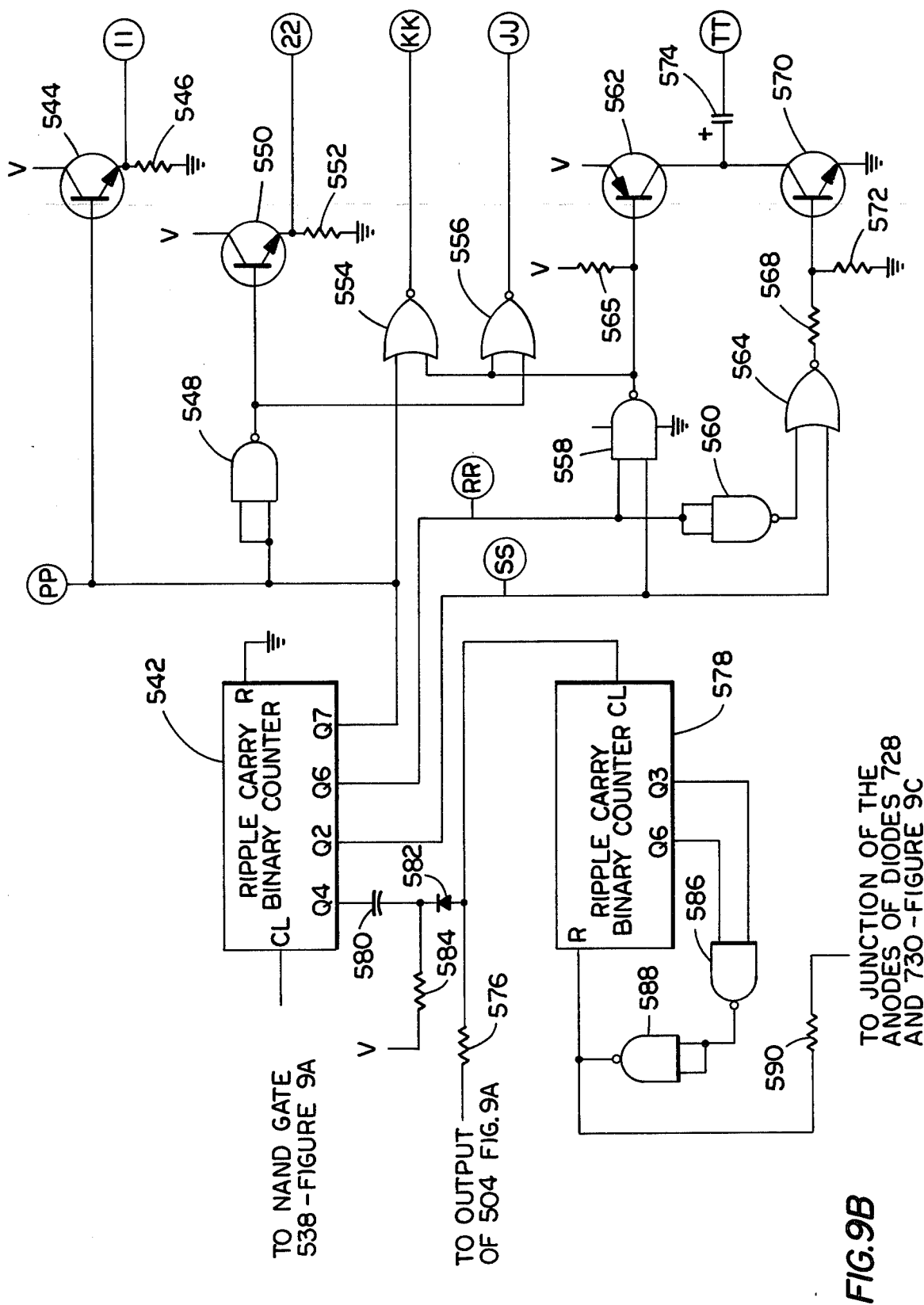

FIG. 9B illustrates the clock input of a ripple carry binary counter 542 which connects to the output of NAND gate 538 (FIG. 9A). The reset input of binary counter 542 connects to ground. The Q7 output connects to the base of PNP transistor 544, to both inputs of NAND gate 548, and to one input of NOR gate 554. The Q7 output of the binary counter 542 outputs the PP switching signal. An emitter resistor 546 connects between the emitter of PNP transistor 544 and ground. The base of PNP transistor 550 connects to the output of NAND gate 548. An emitter resistor 552 connects between the emitter of transistor 550 and ground. Switching transistors 544 and 550 output antenna commutating switching signals 11 and 22.

The inputs of NAND gate 558 connect to the Q6 and Q2 output of binary counter 542. The Q6 output of binary counter 542 also connects to both inputs of NAND gate 560. The output of NAND gate 558 connects to the other input of NOR gate 554, one input of NOR gate 556, and the base of NPN transistor 562. The other input of NOR gate 556 connects to the output of NAND gate 548. NOR gates 554 and 556 output KK and JJ synchronous detector switching signals. A base resistor 565 connects between voltage source V and the base of transistor 562. One input of NOR gate 564 connects to the output of NAND gate 560 and the other input of NOR gate 564 connects to the Q2 output of the binary counter 542. A base resistor 568 connects the base of PNP transistor 570 to the output of NOR gate 564. A resistor 572 connects the base of the transistor 570 to ground. One side of a capacitor 574 connects to the junction of the collectors of transistors 562 and 570 to output the TT loop commutating switching signal.

A resistor 576 connects the clock input of a ripple carry binary counter 578 to the output of operational amplifier 504 (FIG. 9A). A series connected capacitor 580 and diode 582 connect between the Q4 output of binary counter 542 and the clock input of binary counter 578. A resistor 584 connects between the voltage source V and the junction of the capacitor 580 and the cathode of the diode 582. Inputs of NAND gate 586 connect to the Q3 and Q6 outputs of binary counter 578. Both inputs of a NAND gate 588 connect to the output of NAND gate 586. The output of NAND gate 588 connects to the reset input of the ripple carry binary counter 578. A resistor 590 connects the output of NAND gate 588 to the junction of the anodes of diodes 728 and 730 of FIG. 9C.

Figure 9C:
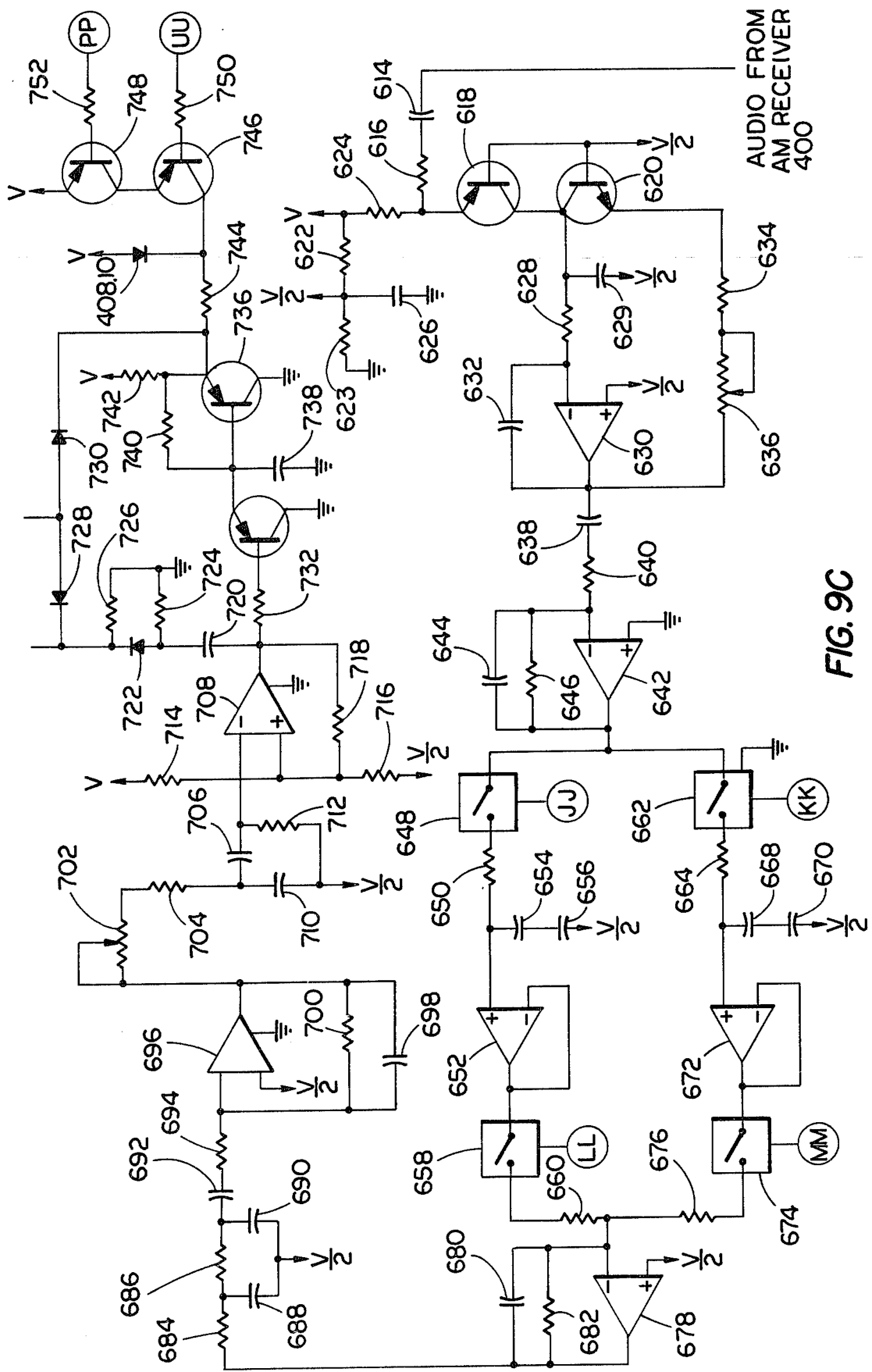

FIG. 9C illustrates the audio signal from the audio output terminal of the AM receiver 400 which connects to a coupling capacitor 614. FIG. 9C illustrates a circuit which includes components and electrical connections between those components which are the same type as illustrated and described with respect to FIG. 4C. (Some of the actual individual component values and frequencies of filters utilized differ.) FIG. 9C additionally illustrates switching transistors 746 and 748 having base resistors 750 and 752.

FIG. 9C illustrates components 614–638 which connect in an electrical configuration to form a narrow bandpass 250 Hz active filter circuit. Components 640–646 connect in an electrical configuration to form a 250 Hz amplifier. Components 614–646 inclusive comprise the filter 458 of FIG. 7. Components 648–652 connect in an electrical configuration to form a synchronous detector, storage circuit, and buffer. Bilateral switch 658 is the chopper. Components 648–660 inclusive and the analogous components 662–676 are the synchronous detector, buffer, and chopper 460 of FIG. 7. Components 678–700 connect in an electrical configuration to form a low pass filter circuit, also denoted as the low pass filter 462 in FIG. 7. Components 702–710 connect in an electrical configuration to form a phase shifter circuit to calibrate the ADF system to the direction of the incoming signal. Components 712–744 connect in an electrical configuration to form a zero crossing detector circuit which is a part of the sweep signal control 464 of FIG. 7. Diode 408.10, centered in the thirty-six segment circular visual directional display 408, is biased by the transistors 746 and 748 and controlled by the UU signal from components 900–928 (FIG. 9F) connected in an electrical configuration to form a high signal means circuit, also denoted as the high signal sensor 466 in FIG. 7.

Figure 9D:
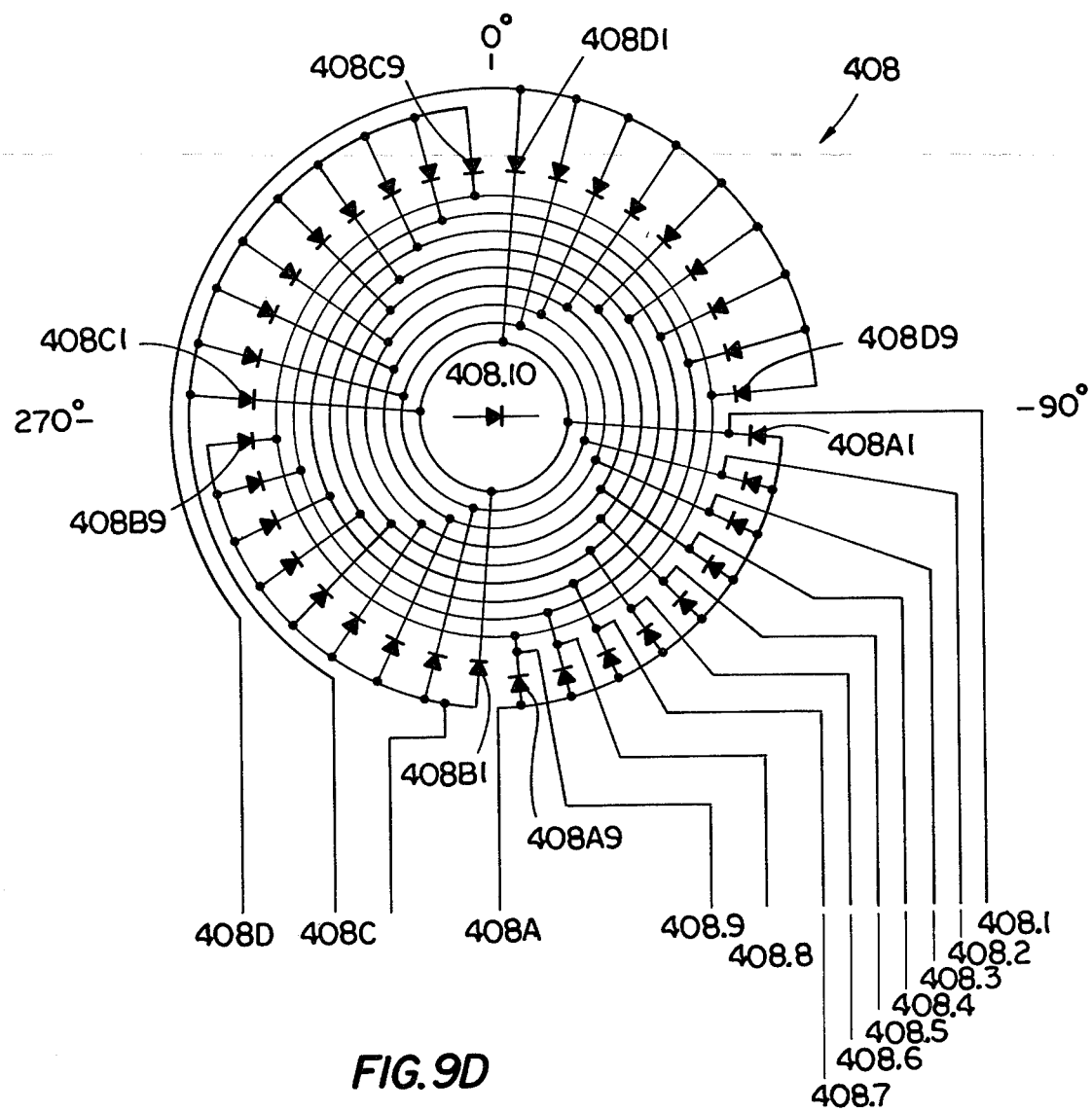

FIG. 9D illustrates the thirty-six segment circular visual directional display 408 which comprises thirty-six light emitting diodes 408A1–408A9, 408B1–408B9, 408C1–408C9, and 408D1–408D9, inclusive, electrically connected in a 9×4 matrix configuration. The diodes are arranged on the circumference of a circle for clockwise viewing order. The diode cathode leads 408.1–408.9 connect to collectors of driver transistors 526.1 to 526.9 of FIG. 9A. The diode anode leads 408A to 408D connect to collector resistors 538A–538D of FIG. 9A. The circular display 408 leads itself to the illustrated physical and electrical circular layout of the diodes and associated conductors on a printed circuit board with diode 408.10 positioned in the center of the circular array. The continuous illumination of center diode 408.10 indicates a received radio frequency signal of low, but sufficient signal strength, while flashing illumination indicates a received radio frequency signal of high signal strength. Also, illumination of center diode 408.10 indicates that the audio signal is being processed by the ADF system signal processor 440. Selective illumination of a segment of the segmented circular visual direction display 408 indicates the direction of arrival of a radio frequency signal received by the direction finding antenna array 402.

Figure 9E:
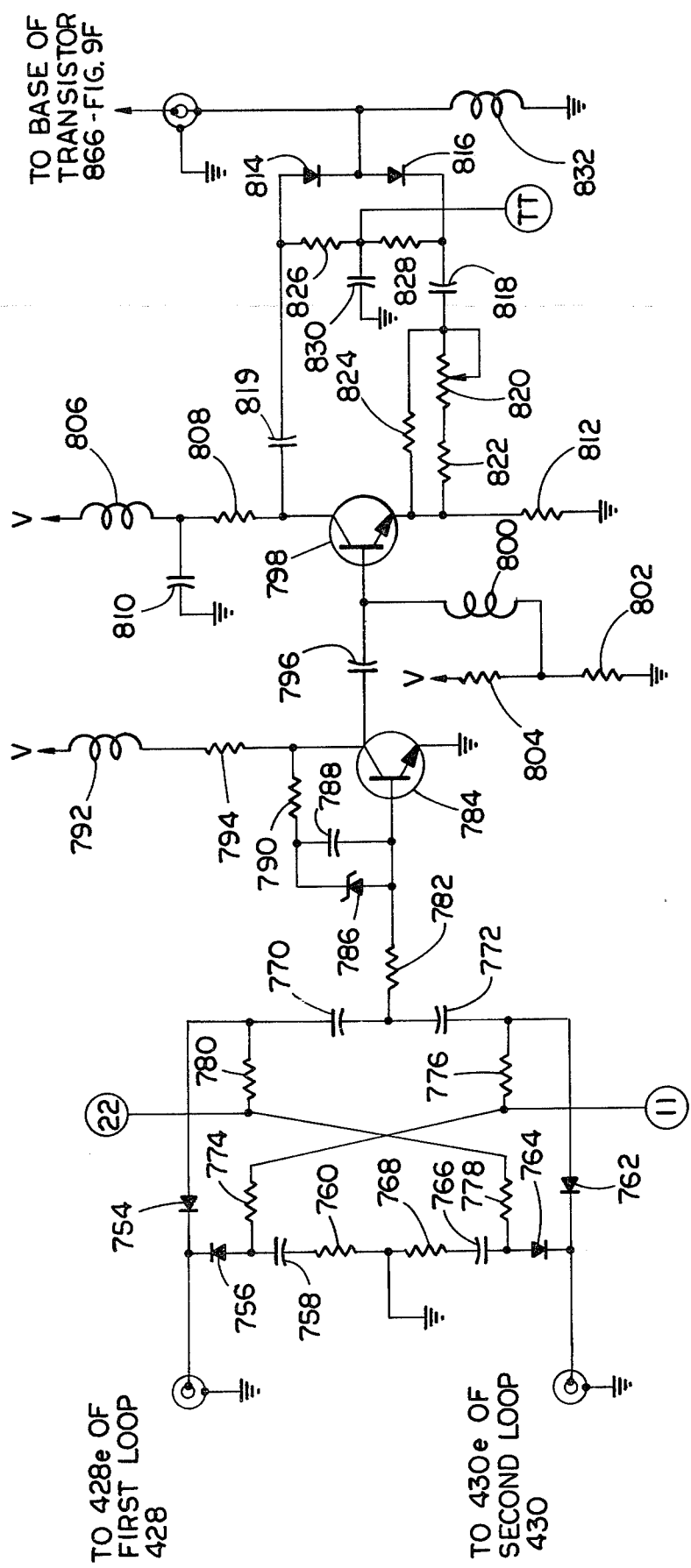

FIG. 9E illustrates the junction of the cathodes of diodes 754 and 756 which has connected to it a coaxial cable extending to primary winding 428e of matching transformer 428d of the first loop antenna 428 of FIG. 6A. The junction of the cathodes of diodes 762 and 764 also similarly connects to primary winding 430e of matching transformer 403d of the second loop antenna 430. A series connection of a capacitor 758, a resistor 760, a resistor 768 and a capacitor 766 connect between the anodes of diodes 756 and 764. The junction of resistors 760 and 768 connects to ground. Capacitors 770 and 772 connect in series between the anodes of diodes 754 and 762. Resistor 774 connects the anode of diode 756 to the antenna commutating switching signal 11 of FIG. 9B. Resistor 776 connects the anode of diode 762 to antenna commutating switching signal 11. Resistor 778 connects the anode of diode 764 to antenna commutating switching signal 22 of FIG. 9B. Resistor 780 connects the anode of diode 754 to antenna commutating switching signal 22. A resistor 782 connects between the junction of capacitors 770 and 772 to the base of PNP transistor 784.

A zener diode 786 in parallel with a capacitor 788 connects in series with a resistor 790 between the base and collector of transistor 784. An inductor 792 in series with a resistor 794 connected between voltage source V and the collector of transistor 784. A capacitor 796 connects the base of a PNP transistor 798 to the collector of transistor 784. An inductor 800 in series with a resistor 802 connects between the base of transistor 798 and ground. A resistor 804 connects between voltage source V and the junction of inductor 800 and resistor 802. An inductor 806 and a resistor 808 connects between the voltage source V and the collector of transistor 798. A capacitor 810 connects between the junction of inductor 806 and resistor 808 and ground. An emitter resistor 812 connects between the emitter of the transistor 798 and ground. A series connection of a capacitor 819, a diode 814, a diode 816, a capacitor 818, a variable resistor 820 and a resistor 822 connect between the collector and the emitter of transistor 798. A resistor 824 connects in parallel across resistors 820 and 822. Series resistors 826 and 828 connect in parallel across diodes 814 and 816. A capacitor 830 connects between the junction of resistors 826 and 828 and ground. The TT switching signal connects to the junction of resistors 826 and 828 to bias the diodes 814 and 816 "on" and "off". An inductor 832 connects between the junction of the cathode and the anode of diodes 814 and 816, respectively, to ground. The junction of the cathode and the anode of diodes 814 and 816 also connect to the base of transistor 866 (FIG. 9F).

Figure 9F:
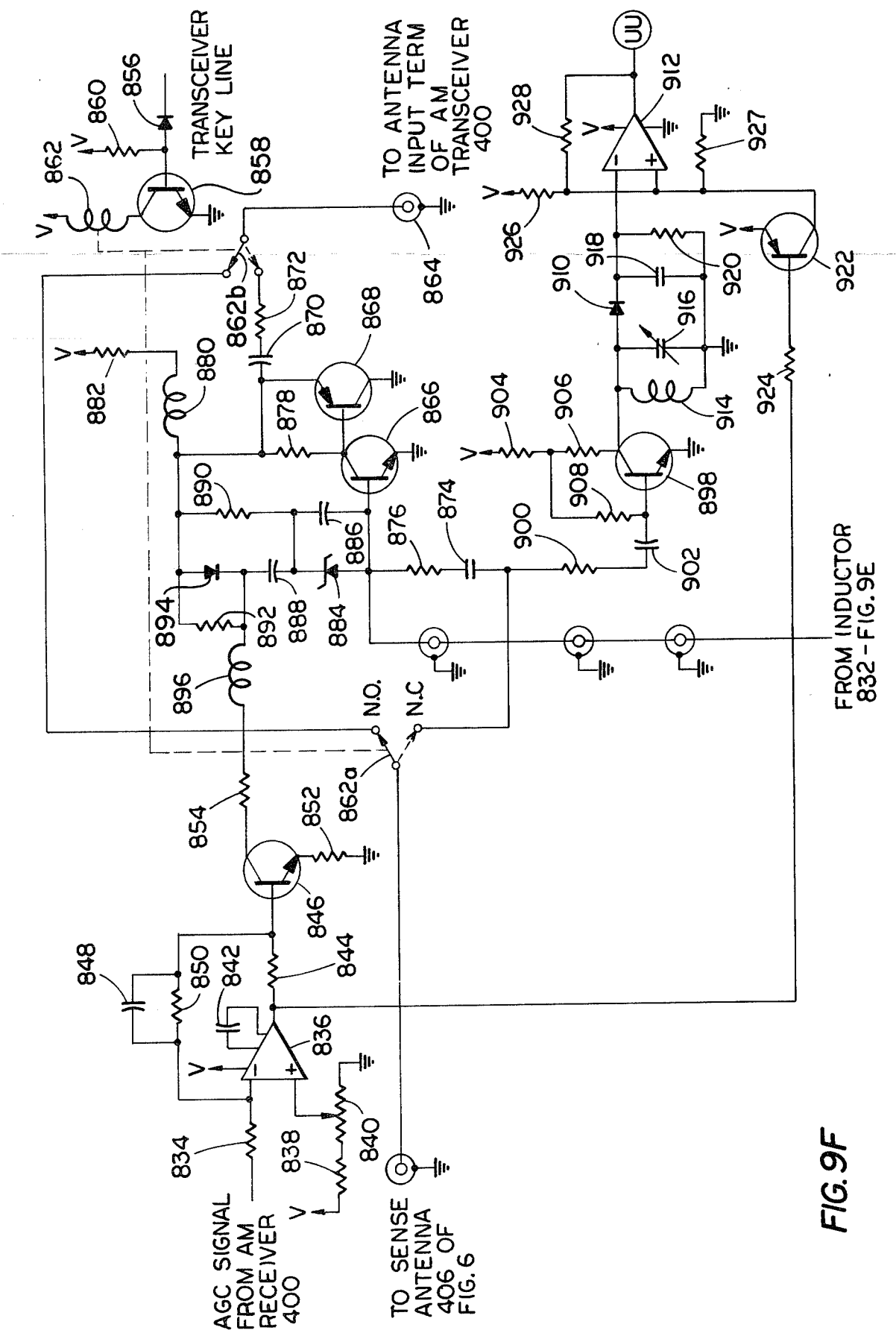

FIG. 9F illustrates a resistor 834 which connects the automatic gain control signal from the amplitude modulation receiver 400 to an inverting input of an operational amplifier 836. A resistor 838 in series with potentiometer 840 connects between the voltage source V and ground. The wiper arm of potentiometer 840 connects to the non-inverting input of operational amplifier 836. A capacitor 842 frequency compensates the operational amplifier 836. A resistor 844 connects the base of an NPN transistor 846 to the output of operational amplifier 836. A feedback capacitor 848 in parallel with a feedback resistor 850 connects between the base of transistor 846 and the inverting input of operational amplifier 836. An emitter resistor 852 connects between the emitter of transistor 846 and ground. A collector resistor 854 connects the collector of the transistor 846 to an inductor 896. On the right side of FIG. 9F, the transmitter key down line from the AM transceiver 400 connects to the cathode of a diode 856. The base of an NPN transistor 858 connects to the anode of diode 856. A resistor 860 connects between voltage source V and the base of transistor 858. A relay coil 862 having contacts 862a and 862b connects between the voltage source V and the collector of the transistor 858. In the center of FIG. 9F, the collector of an NPN transistor 866 connects to the base of a PNP transistor 868. The emitter of transistor 866 and the collector of transistor 868 connect to ground. A capacitor 870 in series with a resistor 872 connects between the emitter of transistor 868 and the normally closed contact 862b of relay coil 862. The radio frequency signal received by the sense antenna 406 of FIG. 6 connects through the series connection of the normally closed contact 862a of relay coil 862, a capacitor 874 and a resistor 876 to the base of transistor 866. The loop commutated signal from the junction of diodes 814 and 816 and inductor 832 of FIG. 9E also connects to the base of transistor 866. A resistor 878, an inductor 880 and a resistor 882 connect in series between the collector of transistor 866 and voltage source V. The junction of the emitter of transistor 868 and capacitor 870 connects to the junction of resistors 878 and inductor 880. A zener diode 884 in parallel with a capacitor 886 connects between the junction of a capacitor 888 and a resistor 890, and the base of transistor 866. A resistor 892 and the cathode of a diode 894 connect between the inductor 896 and the junction of the inductor 880 and the resistor 890. A common junction is formed by resistors 892, 890 and 878, diode 894, inductor 880, capacitor 870 and the emitter of transistor 868.

The output of the sense antenna 406 of FIG. 6 also connects to the base of an NPN transistor 898 through a series connection of the normally closed contact 862a associated with relay coil 862, a resistor 900 and a capacitor 902. A resistor 904 in series with a resistor 906 connect between voltage source V and the collector of transistor 898. A resistor 908 connects between the base of transistor 898 and the junction of resistors 904 and 906. The anode of a diode 910 connects to the collector of transistor 898 and the cathode of diode 910 connects to the inverting input of an operational amplifier 912. An inductor 914 in parallel with a variable capacitor 916 connect from the anode side of diode 910 to ground. A capacitor 918 in parallel with a resistor 920 connect from the cathode side of diode 910 to ground.

A resistor 924 connects the output of operational amplifier 836 to the base of a PNP transistor 922. The emitter of transistor 922 connects directly to voltage source V. The collector of transistor 922 connects to the non-inverting input of operational amplifier 912. A resistor 926 connects between voltage source V and the non-inverting input of operational amplifier 912. A resistor 927 connects between ground and the non-inverting input of operational amplifier 912. A resistor 928 connects between the output and the non-inverting input of operational amplifier 912. The output of operational amplifier 912 also connects to the resistor 750 of FIG. 9C.

Figure 10B:
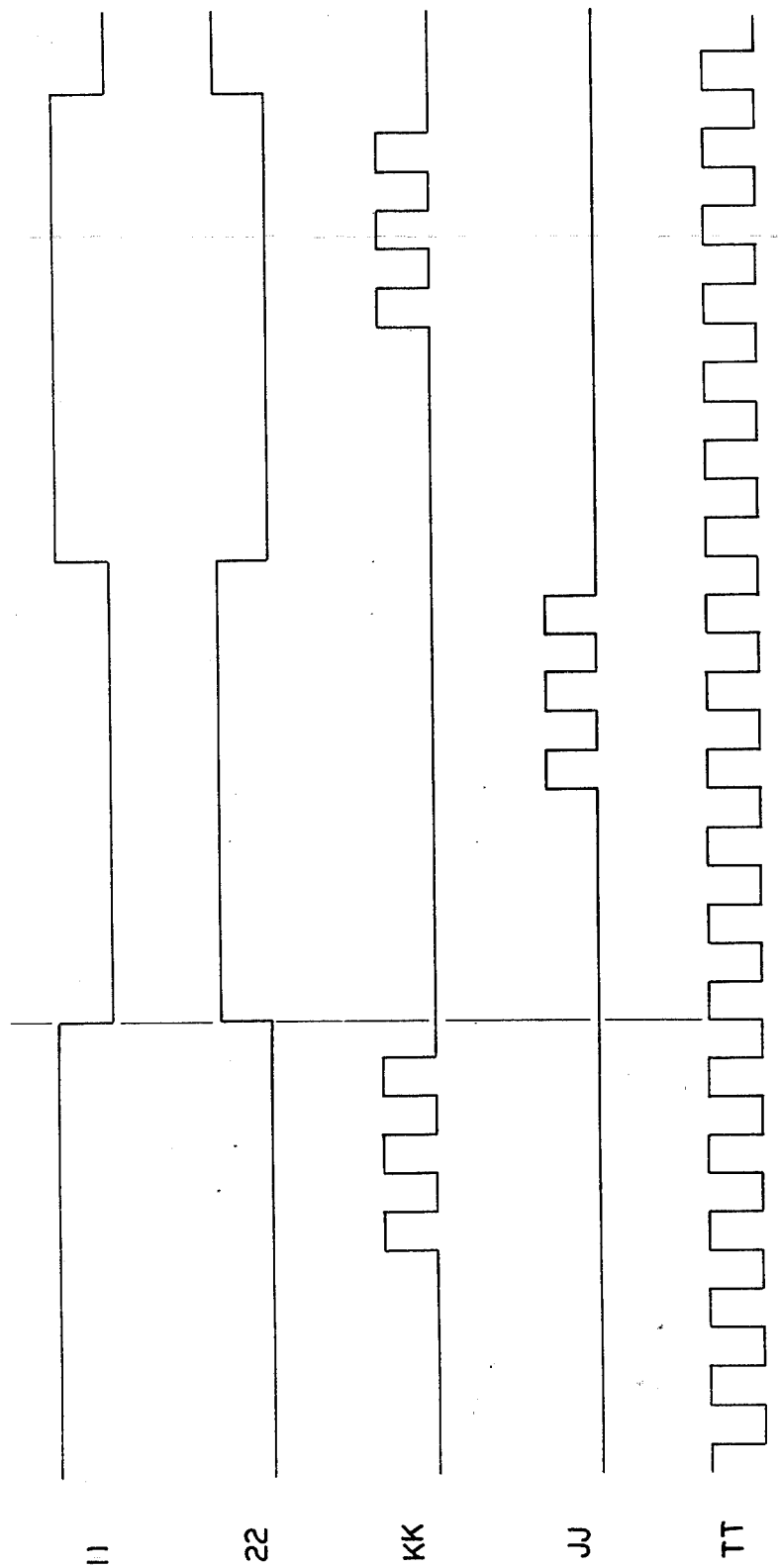
Figure 10C:
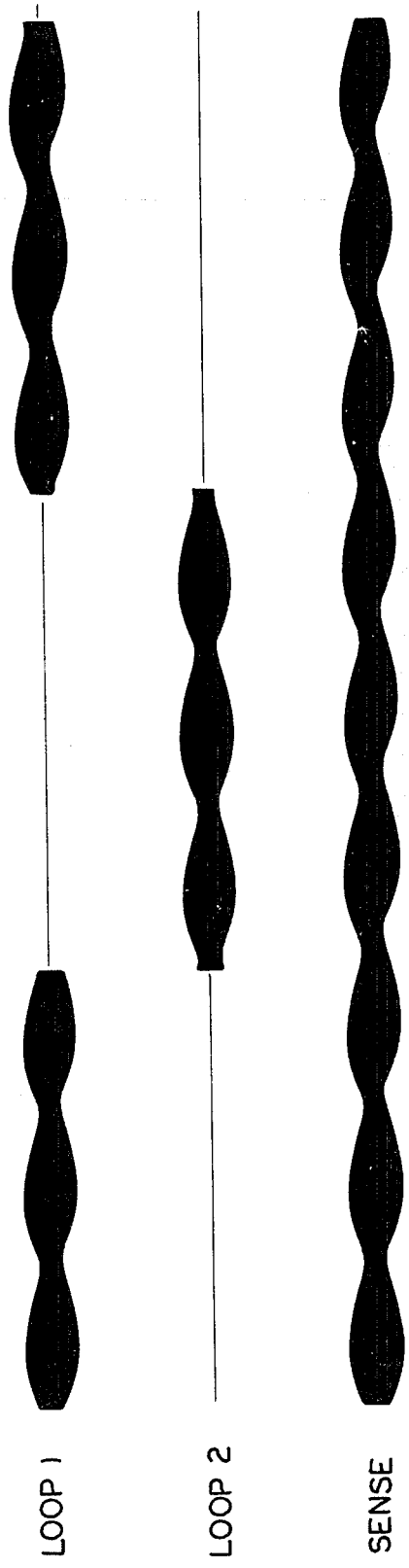

FIGS. 10A–10C illustrate the switching waveform timing signals of the ADF system signal processor 440 used with the AM receiver 400.

FIG. 10A illustrates the LL and MM one kilohertz chopper switching signals outputted by the NAND gates 538 and 540 respectively of FIG. 9A where the LL chopper switching signal leads the MM chopper switching signal by ninety degrees. The PP, PR, and SS switching signals are outputted at the Q7, Q6, and Q2 outputs respectively of the ripple carry binary counter 542. The frequency of the PP signal is 7.5 hertz, the RR signal is 15 hertz, and the SS signal is 250 hertz. Owing to the substantial differences in frequencies, the waveforms are not to actual scale.

FIG. 10B illustrates the loop antenna commutating switching signals 11 and 22 outputted by switching transistors 544 and 550 respectively of FIG. 9B which are 7.5 hertz signals and 180° out of phase. The KK and JJ synchronous detector switching signals outputted by the NOR gates 554 and 556 respectively of FIG. 9b are at a frequency of 250 hertz and are alternately switched during the low RR signal. The TT loop commutating switching signal outputted from the collector junction of the transistors 562 and 570 through the coupling capacitor 574 of FIG. 9B has a frequency of 250 hertz.

FIG. 10C illustrates the radio frequency signals received by the two loop antennas, 428 and 430 (also denoted as the first and second loop antennas). The two antennas are alternately switched by the antenna loop antenna switching signals 11 and 22. The AM radio frequency signal received by the sense antenna is illustrated as an AM signal envelope. The resultant summation radio frequency signal connected to the amplitude modulation receiver antenna terminal is the radio frequency signal received by the sense antenna 406 and summed with the commutated and alternated radio frequency signals received by the loop antennas 428 and 430 and injected at a reduced level.

PREFERRED MODE OF OPERATION

The ADF system signal processor 70 for utilization with the frequency modulation receiver 20 as illustrated in FIG. 2, such as with the receiver in the VHF FM marine radio telephone transceiver 20 as illustrated in FIG. 1 connects to the clock source of frequency such as to the 10.254 MHz crystal frequency in the crystal synthesizer of the transceiver 20 and which is subsequently divided down by two to the eighth power to result in the 40 kHz signal. In the alternative, a square wave oscillator can be utilized to generate the 40 kHz signal. The ADF signal processor system 70 can be manufactured into the frequency modulated receiver of the VHF FM Marine Radio telephone transceiver 20 or, in the alternative, can be manufactured for utilization adjacent to any FM receiver or transceiver as long as the direction finding antenna array is resonant at the reception frequency. The coaxial cable transmission line of the direction finding antenna array 22 connects to the receiver antenna terminal of the FM receiver 20 where the coaxial cable transmission line is of a matching impedance. The 1.11 kHz antenna commutating switching signals 1 and 2 of FIG. 4B connect to the inductors 352 and 354 respectively of FIG. 4E, through lines 68a and 68b. Once the ADF system signal processor 70 is connected to the voltage source V, each segment of the thirty-six segment circular visual directional display 26 is selectively illuminated in a clockwise direction, unless an rf signal of sufficient strength is being received.

FIG. 4A illustrates the 40 kHz clock source which connects to isolation diode 100 and NAND gates 104 and 106 which sharpen the edges of the signal. The binary counter 108 divides the signal by nine and the shift register 130 divides the output of the binary counter 108 by four. The binary counter 108 and the shift register 130 comprise the divider of the block diagram of FIG. 2 and are synchronously reset. The binary-coded-decimal decoder 122 connects between the nine switching transistors 126.1–126.9 and the outputs of the latch 110, the inputs of which connect to the outputs of the divide by nine binary counter 108 and sequentially switches the transistors 124.1 to 124.9 to be sequentially conductive, one at a time. The latch 132 connects between the four switching transistors 138A–138D and the outputs of the shift register 136 and sequentially switches the transistors 138A–138D to be sequentially conductive, one at a time. The 9×4 diode matrix 26A1–26A9, 26B1–26B9, 26C1–26C9 and 26D1–26D9 inclusive of FIG. 4D form the thirty-six segment circular visual directional display 26 of FIG. 4D where each diode is sequentially illuminated in a clockwise direction when the ADF system signal processor 70 is not locked on and processing an audio signal for directional information of the received radio frequency signal.

FIGS. 4B and 4A illustrate NAND gates 142 and 144 which output 1.11 kHz M and L chopper switching signals (forty kilohertz divided by thirty-six of the divide by nine counter 108 times the divide-by-four shift register 132) from the shift register 132 where the L switching signal leads the waveform of the M switching signal by ninety degrees as illustrated in FIG. 5A. The shift register 146 through the binary counter 150 outputs the additional switching signals R having at frequency of 34.72 hertz and P having a frequency of 17.36 hertz to synchronously control ADF system signal processor 70 switching functions including the switching of the pairs of antennas and the synchronizing of the display 26 to selectively illuminate the segment of the circular visual directional display 26 corresponding to the direction of arrival of the received radio frequency signal. The K and J synchronous detector switching signals each have a 25% duty cycle and are generated from the NOR's of the P and R and P' and R' signals respectively, and are illustrated in FIG. 5B. The antenna commutating switching signals 1 and 2 are generated from M, P, and reciprocal signals appropriately NANDed and NORed and are illustrated in FIG. 5B. The electrical elements 142 to 200 of FIG. 4B comprise the counter 80 of FIG. 2 to generate the antenna and synchronous detector switching signals.

The sweep display 82 of FIG. 2 and electrical elements 200–212 of FIG. 4B comprise a pulse swallower and sweep display to avoid by seventy three every eighth time the divide-by-72 counter 206 counts. This results it an effect on the circular display which is similar to a stroboscopic effect. The divide-by-four shift register 146 is further divided by four by binary counter 150 yielding a divide-by-sixteen counter of the 1.11 kHz Q4 output of the shift register 130. Components 206 to 212 are a secondary divide-by-72 counter which produces one pulse for every 72 pulses appearing at the output of NOR gate 204. Except for the intervention of NOR gate 204, the action of this secondary divide-by-72 counter in dividing the 40 kHz reference signal would be analogous to the primary divide-by-36 counter of binary counter 108 and shift register 130. The output of the secondary divide-by-72 counter would be in synchrony with the output of the primary counter. This in fact occurs for 16 complete cycles of the primary counter. However, after 16 cycles of the primary counter, the Q2 output of binary counter 150 appropriately changes state. This change of state, through the action of flip-flop 200 and NOR gate 202, blocks one pulse of the 40 kHz reference from passing thrugh gate 204. This, in effect, causes a division by 73 once every 8 cycles of the secondary counter, and a division by 72 during the remaining cycles. NOR gate 204, in effect, swallows one pulse for every 577 counts (36×16+1) of the 40 kHz oscillator. The output of the secondary counter controls latches 110 and 132 when no signal of sufficient strength is being received. Thus a specific light emitting diode will be illuminated during 16 cycles of the primary counter, and an adjacent light emitting diode will be illuminated during the next 16 cycles of the primary counter. This process continues so that the thirty-six segment circular visual directional display 26 is driven in a clockwise direction at a rate of 1.92 revolutions per second. Each revolution takes 0.52 seconds, each segment is activated for 14.4 milliseconds and 69.4 segments are activated in sequence every second. This activity has no distinct relationship to the actual direction finding activity of the receiver, but it gives the appearance of actual activity of the receiver. It is preferred that the activation of segments occur at a rate to cycle through all segments at from 0.1 to 10 complete cycles per second, and more preferably at about 1 or 2 cycles per second. It is, of course, important that the rate be such as to be visually preceptible. In the case of a circular display, the perception of radar-like motion adds much to the appeal of the receiver.

FIG. 4F illustrates the first pair of antennas 40 and 42 of the direction finding antenna array 22 of FIGS. 1 and 4E. The first pair of antennas are spaced less than one-half wavelength apart. Two identically spaced antennas 44 and 46 comprise a second pair of antennas of the direction finding antenna array 22. The second pair of antennas is orthogonally positioned with respect to the first pair of antennas. The alternate 1.11 kHz antenna commutating switching signals 1 and 2 of FIG. 4B connect to the first and second pairs of antennas of FIG. 4E, respectively.

FIG. 5C illustrates rf signals A1 of antenna 40, A2 of antenna 42, A3 of antenna 44 and A4 of antenna 46. The rate of comutation of antennas within each pair is preferably between 30 and 3,000 Hz. In the preferred FM embodiment the commutation is at a frequency of 1.11 kHz. It is important that the rate of comutation of the antennas not exceed a frequency which would put the resultant modulation outside the bandpass of the receiver. If the commutation is too slow, the response time of the ADF is impaired. A typical FM marine receiver would have a bandpass of plus or minus 7.5 kHz, although near the limits of bandpass undesirable distortion is likely to occur.

In the preferred FM embodiment, each pair of antennas is commutated during a time period of 28.8 milliseconds. If the time period is too great, the response time of the ADF is impaired. If the time period is too small, the detectors of the commutation frequency do not have sufficient time to stabilize and produce accurate vector values. Preferably, each commutation of an antenna pair will be between 10 and 500 milliseconds, with the ratio of the commutation frequency to the rate of alternation between pairs of antennas preferably being from between 10 and 500 to one.

At the first pair of antennas 40 and 42, the antenna commutating switching signal 1 switches the PIN diodes 356 and 360 to be alternately conductive. Antenna switching signal 1 alternately forward biases diodes 356 and 360 "on" for the low and high portions, respectively, of antenna switching signal 1. During this time antenna switching signal 2 is at ground level and neither PIN diode 366 or 370 are conductive. Later, when the antenna switching signal 1 is "off" and therefore the first pair of antennas 40 and 42 are off, the second pair of antennas 44 and 46 are likewise commutated by the action of the 1.11 kHz antenna commutating switching signal 2 on PIN diodes 366 or 370. The rapid switching between the antennas 44 and 46 of the second antenna pair over the P' time interval and then between the antennas 40 and 42 of the first antenna pair over the P time interval produces a time multiplexed carrier phase shift modulation of the received radio frequency signals by the two pairs of antennas which changes depending upon the time that the electromagnetic wavefront of the received radio frequency signal reaches the antennas of the direction finding antenna array 22. In effect two vector values are alternately phase modulating the received signals. These vector values are later separately detected and used to display the direction from which the received signal arrived. The rapid commutation occurs at an audio frequency switching frequency so as to be compatible with the IF passband of the frequency modulated receiver 20. If the antennas of either pair of antennas of the direction finding antenna array 22 are equally distant to the electromagnetic wavefront of the received radio frequency signal, then there is no difference in the time at which the radio frequency signal is received at either antenna and therefore no phase shift occurs during the switching of the antennas. However, if the antennas in either pair of antennas are at a different distance to the electromagnetic wavefront of the received radio frequency signal including the case of one antenna behind the other, then there is a phase shift which occurs between the signal received at the first antenna nearest to the electromagnetic wavefront of the received radio frequency signal and the second antenna farthest from the electromagnetic wavefront of the received radio frequency signal. The alternate switching between the two antennas of each pair of the antennas at a frequency of 1.11 kHz introduces the carrier phase shift component which subsequently is detectable in the audio detector (discriminator) output of the FM receiver 20. The audio detector produces a frequency which is the same as the antenna commutating switching frequency of 1.11 kHz and having an audio component which is proportionate in amplitude to the phase difference between the signals received by the two antennas of the pair of antennas which is being commutated at the time. The polarity of the FM receiver's audio output signal is dependent on which antenna of each pair of antennas leads in the phase shift component. The time multiplexed radio frequency signal contains first and second phase modulated audio frequency components corresponding to a first and second vector. These vectors are vector components of the direction from which said received radio frequency signal arrived with respect to the direction finding antenna array 22.

FIG. 4C illustrates the audio output signal from the detector of FM receiver 20 which connects to the coupling capacitor 214 and contains the 1.11 kHz component resulting from the antenna commutation. This component is proportional in amplitude to the radio frequency phase difference between the two pairs of antennas of the direction finding antenna array 22 and having a polarity which is dependent on which antenna leads the other antenna in the pair of antennas. A 1.11 kHz filter 84 of FIG. 2 and electrical components 214–236 of FIG. 4C filter out the audio signal component to pass only the 1.11 kHz signal. A 1.11 kHz amplifier comprising electrical components 238–246 amplifies the filtered signal and capacitor 244 corrects the phase shift of the filtered signal with respect to the J and K switching synchronous detector signals generated in FIG. 4B and illustrated as synchronous detector switching signal timing waveforms in FIG. 5B. The output signal from the operational amplifier 242 connects to the bilateral switches 248 and 262 of the synchronous detector 86 of FIG. 2 and electrical components 248–276 of FIG. 4C. Since the synchronous detector 86 detects synchronously and integrates over a long time period it is unaffected by speech or other signals which are not frequency or phase coherent with the synchronous detector.

The J and K synchronous detector switching signals illustrated in FIG. 5B differ from the antenna switching signals in that the J and K switching signals switch only during the last half of the period that the antenna switching signals 1 and 2 switch. This is done since the 1.11 kHz filter 84 of FIG. 2, electrical components 214–236 of FIG. 4C, require a finite period of time to stabilize. During the first half of each interval of commutating by the antenna switching signals 1 and 2, the narrow bandpass, high Q, 1.11 kHz filter stabilizes on the signal and during the last half of each interval the J and K synchronous detector signals switch to synchronously detect the signals. The detector detects the amplitude of the filtered signal synchronously so that both positive and negative values of amplitude are detected. This allows the differentiation between leading and lagging arrival of wavefronts to the two antennas in a pair.

The J and K switching synchronous detector signals connect to the bilateral switches 248 and 262 to periodically samples the 1.11 kHz filtered signal. The resultant direct current signals are stored on the tantalum capacitors 254 and 256, and 268 and 270. The direct current signal output of the bilateral switches 248 is representative of the vector equal to the radio frequency phase difference between the first pair of antennas 40 and 42. The direct current signal output of the bilateral switches 262 is representative of the vector equal to the radio frequency phase difference between the second pair of antennas 44 and 46. The two vectors together derive a resultant vector on a circle representative of the direction of arrival of the received radio frequency signal. Since the bilateral switches 248 and 262 detect synchronously and integrate over a long time period it is unaffected by speech or other signals which are not frequency or phase coherent with the synchronous detection.

The charges stored on capacitors 254-256 and 268-270 persist for a long period of time as the tantalum capacitors store current charges over long periods of time. The direct current signals stored on the capacitors 254-256 and 268-270 are buffered by the non-inverting, high impedance inputs of the operational amplifiers 252 and 272, respectively, and chopped by chopper switching signals L and M of FIG. 4B and as illustrated in FIG. 5A to produce summed chopped signals having a continuous phase indication and having a distinct phase relationship to the primary divide-by-36 counter (including binary counter 108 and shift register 130) whose output at any point in time may be retained by latches 110 and 132. The summed chopped signals are integrated (filtered) by the operational amplifier 278 yielding a phase shifted sine wave signal having constant amplitude and having a frequency equal to the antenna switching signals of 1.11 kHz. The output of the operational amplifier 278 is passed through the filter 88 of FIG. 2, electrical components 284-300 of FIG. 4C, to eliminate any high frequency components in the phase shifted sine wave output signal.

The sweep signal control 90 of FIG. 2, electrical components 302-344 of FIG. 4C, applies the phase shifted sine wave output signal having a zero crossing, corresponding to the direction of arrival of a received radio frequency signal with respect to the direction finding antenna array 22, to the crossover detector network of the operational amplifier 308 of FIG. 4C.

The crossover detector is a component of the phase detecting circuit includes a signal threshold detector with feedback which changes the threshold point from a zero crossover point to a defined offset whereby a diminished sine wave input will not vary the result and a direction signal squelch point is achieved for very low signals. The threshold detector includes the operational amplifier 308 having a sine wave signal from capacitor 306 connected to its inverted input. The non-inverted input has a 470 kilohm resistor 314 connecting to voltage source V, a 470 kilohm resistor 318 connecting to the output of the operational amplifier 308. The offset is achieved with the connection of the smaller 10 kilohm resistor 316 connecting to the voltage source V/2 which is the voltage of the zero crossing value.

The output of the crossover detector forward biases switching diode 322 of FIG. 4C to latch latches 110 and 132 of FIG. 4A thereby selectively illuminating one segment of the thirty-six segment circular visual directional display 26 indicating the direction of arrival of the received radio frequency signal with respect to the direction finding antenna array 22. At the zero crossing of the phase shifted sine wave output signal, the latches 110 and 132 of FIG. 4A latch on the output the count of the primary divide-by-36 counter (binary counter 108 and shift register 130) which is phased locked with the L and M 1.11 kHz chopper switching signals so that the appropriate selective segment of the thirty-six segment circular visual directional display 26 illuminates indicating the direction of arrival of the received radio frequency signal. While each segment of the thirty-six segment circular visual directional display 26 is sequentially illuminated in a clockwise direction yielding the psychological operator visible effect that the ADF system is scanning, searching, etc., in a 360° sweep for any originating sources of radio frequency signal transmissions, at a rate of 1.92 revolutions per second where each segment is illuminated for the duration of 14.4 milliseconds, the ADF system signal processor 70 promptly illuminates the appropriate selective segment of the circular visual directional display 26 regardless of the sequential segment illuminated during the immediately preceding clockwise illumination of each segment of the display 26. While the display 26 gives the visible psychological appearance of sweeping, scanning, searching, etc., at a visibly perceptible rate, to locate an originating source of a received radio frequency signal, in electrical operation the ADF system signal actually scans much more rapidly and can promptly lock onto the received radio frequency signal in less time than it takes to sweep display 26. By way of example and for purposes of illustration only, if the ADF system 70 is sequentially illuminating segments in a clockwise direction in the lower portion of the display 26 referenced as the 180° direction and the direction finding antenna array 22 locks on to a radio frequency signal from the 360° direction with respect to the direction finding antenna array 22, then the selective segment on the top portion of the display 26 promptly illuminates thereby jumping from the bottom portion of the display 26 and skipping the segments in the lower portion (80° to 260°) and the upper portion (270° to 350° and 10° to 90°) of the display 26. There is no distinct relationship between (1) the sequentially illuminated segment when the display 26 is being illuminated in a clockwise direction when no signal of sufficient strength is being received and (2) a selective illuminated segment of the display 26 controlled by the signal to the clock inputs of the latches 122 and 132 of FIG. 4A from the diodes 322 and 328 of FIG. 4C of the sweep signal control circuit. In the preferred embodiment, the two mechanisms of illumination are mutually exclusive. The rate of revolution and duration of illumination of the display 26 is dependent on the frequency of the clock source of frequency and the amount of dividing circuitry used to control the pulse swallowing. Preferably, the rate of revolution of sequential illumination can be in the range of 0.1 to 10 revolutions per second and the duration of time of illumination of each segment can be in the range of 2.7 to 270 milliseconds. The center segment 26.1 of the thirty-six segment circular visual directional display 26 of FIG. 4D illuminates indicating that a radio frequency signal has been received by the FM receiver 20, the radio frequency signal has been detected, and the zero crossover of sine wave signal has been detected indicating that the ADF system signal processor 70 is locked onto the received radio frequency signal.

The variable resistor 302 calibrates the zero crossing of the phase shifted sine wave signal from the low pass filter 88 of FIG. 2, electrical components 294–300 of FIG. 4C, and permits electronic fine tuning of the ADF system 70 to compensate for the physical placement of the direction finding antenna array 22. The variable resistor 302 can be conveniently positioned so as to be accessible by the operator and has a resistance to permit adjustment over a latitude range of plus or minus five degrees by way of example and for purposes of illustration only.

When an rf signal is no longer received by the FM receiver 20, sequential clockwise illumination of each segment of the circular visual directional display 26 is resumed from the count that the secondary divide-by-72 counter (including sweep display 82 of FIG. 2, electrical circuit components 200–212 of FIG. 4B), has with respect to the primary counter at the time that the response to a received signal ceases. There is an inherent circuit delay of about 200 milliseconds before the resumption of sequential illumination of the display 26. The automatic direction finding system thus includes means to hold latches 110 and 132 in a latched state for a predetermined time period of about 200 milliseconds after the received radio frequency signal ceases. Through this action, display 26 holds the selective illuminated segment illuminative thereby holding the direction finding fix on display 26 for a predetermined time period. The predetermined time period is determined primarily by vector storage capacitors 254, 256, 268 and 270 and to a lesser extent by capacitor 338 (FIG. 4C) in combination with their corresponding charging resistances. If desired the circuit could be modified to retain the found direction longer. While the sweep display 82 of FIG. 2, elements 200–212 of FIG. 4B, is blocked by diodes 328 and 330 when a radio frequency signal is received and processed, the sweep display 82 is still electronically counting and the clockwise illumination of the segmented display 26 begins essentially randomly based upon the coincidental relationship of the count of the sweep display 82 to the count of the dividers 74 and has no particular relationship to the selective illuminated segment of the circular visual directional display 26 corresponding to the direction of arrival of the received radio frequency signal with respect to the direction binding antenna array 22.

The ADF system signal processor 440 for utilization with the AM receiver of an amplitude modulated transceiver 400 as illustrated in FIG. 6 can be integrally manufactured into the AM receiver section of the AM transceiver such as a Citizens Radio Service (also known as CB in the industry) transceiver 400 as illustrated in FIG. 6 or in the alternative, the ADF system signal processor 440 can be manufactured for utilization adjacent to any AM receiver or an AM transceiver as long as a direction finding antenna array is utilized which is resonant at the reception frequency.

The antenna output terminal 864 of FIG. 9F of the ADF system signal processor 440 connects to the transceiver antenna terminal of the AM transceiver 400 with a coaxial cable transmission line having a matching characteristic impedance of the transceiver antenna terminal. The antenna loop selector commutating switching signals 11 and 22 of FIG. 9B connect to the primary windings 428e and 430e of the balun matching transformers 428d and 430d of the loop antennas 428 and 430 respectively. Once the ADF system signal processor 440 is connected to the voltage source V, each segment of the thirty-six segment circular visual directional display 408 is sequentially illuminated in a clockwise direction indicating that the ADF system 440 is functioning.

Operation of the ADF system 440 in utilization with the AM receiver 400 is referenced to FIGS. 6–10 inclusive of the drawings, particularly the electrical circuit shematic of FIGS. 9A–9F and the timing signal waveforms of FIGS. 10A–10C illustrating the switching signals to control the switching functions of the ADF system signal processor 440 including the switching of the loop antennas 428 and 430 of the direction finding antenna array 404 and the sequential illumination of each segment of the circular visual directional display 408 in a clockwise order when the AM receiver 440 is not receiving a radio frequency signal of sufficient strength.

FIG. 9A illustrates electrical components 500–510 which connect to form an oscillator, denoted as the clock 442 in FIG. 7, to generate a 36 kHz frequency to control the switching functions of the ADF system signal processor 440. The binary counter 512 (with associated gates 516 and 518) divides the 36 kHz signal by a factor of nine and the shift register 520 (with associated gate 532) divides the output of counter 512 by four. These components comprise a primary divide-by-36 divider, denoted as the divider 444 in FIG. 7. The binary-coded decimal decoder 522 connects between the nine switching transistors 526.1–526.9 and the outputs of the quad D clocked latch 514 to sequentially switch the transistors 526.1–526.9 to be conductive. The quad D clocked latch 530 connects between the four switching transistors 536A–536D and the outputs of the shift register 520. The 9×4 diode matrix 408A1–408A9, 408B1–408B9, 408C1–408C9 and 408D1–408D9 inclusive of FIG. 9D comprise the 36 segment circular visual directional display 408 in FIGS. 6 and 7. Each diode is sequentially illuminated in a clockwise direction when the ADF system signal processor 440 is not locked on and processing an audio signal for directional information of the received radio frequency signal. The NAND gates 538 and 540 output 1.0 kHz LL and MM chopper switching signals (36 kHz clock source of frequency divided by 36 of the primary divide-by-36 divider) where the LL switching signal leads the waveform of the LL switching signal by ninety degrees as illustrated in FIG. 10A.

FIG. 9B illustrates the binary counter 542 which outputs the additional switching signals of PP having a frequency of 7.8125 Hz. PP is used to synchronously control the switching of loop antennas 428 and 430 through the loop selector switching signals 11 and 22, respectively. PP is also used to flash the signal strength diode 408.10 of FIG. 9C. RR has a frequency of 15.625 Hz. SS and TT have a frequency of 250 Hz. The Q4 output of binary counter is at a frequency of 62.5 Hz. This frequency controls the pulse swallowing rate of sweep display 450 to result in a sweep rate of 1.74 revolutions per second of the display 408. The pulse swallowing is the result of the change of state (from plus to minus) of the Q4 output of counter 542. This causes diode 582 to momentarily conduct, shorting one clock pulse which would otherwise be counted by counter 578. Each revolution of display 408 takes 0.58 seconds, each segment is activated for 16 milliseconds and 62.5 segments are activated in sequence every second.

The KK and JJ chopper switching signals are generated by the logic gates 554 and 556. The TT loop commutator signal is generated by the logic gates 558-574. Elements 542-574 are denoted as the counters 449 of FIG. 7. Elements 578, 586 and 588 comprise the sweep display circuit 450 of FIG. 7 to selectively illuminate each segment of the segmented circular visual directional display 408 in a clockwise viewing order when a radio frequency signal is not being received by the AM receiver 440. The elements divide the 36 kHz signal minus the SS 62.5 Hz signal by 72 which results in the latches latching onto the next output to sequentially illuminate the next segment of the circular display after 577 counts thereby driving the 36 segment circular visual directional display in a clockwise direction.

FIG. 9E illustrates the elements 754-832 which comprise the loop selector, the loop amplifier and one-hundred eighty degree phase splitter, and the loop commutator 452 of FIG. 7. The 11 and 22 7.5 Hz loop antenna switching signals from the switching transistors 544 and 550 of FIG. 9B switch between the first and second loop antennas 428 and 430 of FIGS. 6 and 7 through the pairs of PIN switching diodes 754 and 756, and 762 and 764 respectively. Switching between the loop antennas 428 and 430 synchronously samples the signal strength of the received AM signal. The loop antennas 428 and 430 of FIG. 6A have a bidirectional pattern which is maximum in the directions in the plane of the loop and minimum in the directions broadside to the loop while the vertical sense antenna 406 of FIG. 6A has a nondirectional circular pattern. The vertical sense antenna utilized in conjunction with the loop antenna yields a cardiod reception pattern. The loop antennas 428 and 430 are orthogonally positioned with respect to each other for maximum gain and are alternately switched at a frequency of 7.5 Hz by the 11 and 22 antenna loop switching signals switching between the pairs of PIN diodes 754 and 756, and 762 and 764 thereby sampling the amplitude of the received radio frequency signal.

The output of the loop selector, elements 754 to 780, is connected through a cascade transistor-loop amplifier, elements 782-794, and through the one-hundred and eighty degree phase splitter portion of the cascade transistor amplifier, elements 796-812. The loop commutator, elements 814 to 832, commutates the one hundred and eighty degree phase shift signals with the TT loop commutating signal from transistors 562 and 570 of FIG. 9B at a frequency of 250 Hz by alternately connecting the collector and emitter of transistor 798 through the switching diodes 814 and 816. The TT loop commutating signal alternates the phase of the AM radio frequency signal received by the loop antennas 428 and 430 thereby electronically commutating and introducing a phase shift with respect to the signal received by the loop antennas 428 and 430. When this commutated signal is mixed with the signal from the sense antenna, the resultant received signal will inherently have amplitude modulated components which are representative of the values of the vectors indicating the direction of arrival of the received signal. These components are detected by an AM detector, an audio filter at the commutation rate, and two separate synchronous detectors of the filtered signal from the AM detector.

FIG. 9F illustrates automatic gain control (AGC) signal from the AM receiver 400 of FIG. 7 which connects to the AGC amplifier and threshold adjustment, 456 of FIG. 7 and elements 834-854 of FIG. 9F, and is amplified so that the threshold value is set where the threshold adjusted AGC signal provides desired gain of the loop antenna signals and the sense antenna signal without distortion or intermodulation of the radio frequency signals. The threshold adjusted AGC signal provides that the summation amplifier and AGC control, 454 of FIG. 7 and elements 866-896 of FIG. 9F, processes signal levels from the sense antenna 406 and the loop antennas 428 and 430 without losing any signal information due to intermodulation or distortion of or between the signals. The summation amplifier and AGC control amplifies and mixes through the transistors 866 and 868 where the summation amplifier injects the loop commutated signal in the range of ten percent to the radio frequency signal of the sense antenna 406. The resultant radio frequency output signal at the output terminal 864 is an amplitude modulated radio frequency signal being modulated to contain time multiplexed vector information which may be detected by an AM detector, a filter at the commutation frequency and two separate synchronous detectors with associated storage circuits to detect and hold the components of the filtered signal detected by the AM detector. The gain of the summation amplifier, transistors 866 and 868, is controlled by the threshold adjusted automatic gain control signal. The synchronous sampling of the received radio frequency AM signal between the loop antennas 428 and 430 of the direction finding antenna array 404 at a switching frequency of 7.5 Hz, subsequent electronic commutation of the sampled signal at loop commutation frequency of 250 Hz and adding this sampled signal to the radio frequency amplitude modulated signal received by the sense antenna 406 at a twenty percent injection rate (by way of example and for purposes of illustration only while any other suitable injection rate could be utilized) places AM information on the received radio frequency AM signal which is processed and demodulated by the amplitude detector of the AM receiver 400 subsequently appearing on the audio output signal of the AM receiver 400.

In FIG. 9F the relay contacts 862a and 862b associated with relay coil 862 in conjunction with the switching transistor 858 switch the sense antenna 406 of FIGS. 6 and 7 between the junction of the capacitor 874 and the resistor 900 in the receive mode of operation and the antenna output terminal 864 in the transmit mode of operation. The AM transceiver 400 key down line from the microphone of the AM transceiver 400 of FIGS. 6 and 7 connects to the switching transistor 858 through the diode 856.

In FIG. 9F the received radio frequency signal from the sense antenna 406 is also processed by the high signal sensor, 466 of FIG. 7 and elements 900-928 of FIG. 9F, which is controlled by the threshold adjusted AGC signal from the AGC amplifier 456 of FIG. 7, the operational amplifier 836 of FIG. 9F. While components 834-896 and 900-912 are shown separately from the receiver, the circuit function of these components would be appropriately incorporated into the standard AGC circuits of a receiver which fully integrates the ADF circuits with the receiver circuitry. The operational amplifier 912 generates a continuous signal UU above a certain signal threshold regardless of the amount of excess signal level at the sense antenna 406. The UU signal connects to the switching transistor 746 of FIG. 9C. When a radio frequency signal of sufficient but relatively low signal strength is received by the direction finding antenna array 402 of the ADF system signal processor 440 utilized in conjunction with AM receiver 400, the light emitting diode 408.10 (FIG. 9C, also in FIG. 9D as the central light emitting diode of the segmented circular visual light emitting diode display 408) is continuously illuminated as the output of the operational amplifier 912 of FIG. 9F is low thereby biasing the transistor 746 off. When a radio frequency signal of relatively high signal strength is received by the direction finding antenna array 402 of the ADF system 440, the light emitting diode 408.10 is pulse illuminated at the frequency of the PP signal, 7.5 Hz, from the ripple carry binary counter 542 of FIG. 9B, as the output of the operational amplifier 912 of FIG. 9F is high thereby biasing the switching transistor 746 on. The output of the operational amplifier 912 goes high for relatively high signal strengths regardless of the threshold of the signal strength to pulse and flash the center light emitting diode 408.10 of segmented circular visual directional display 408 as previously described.

FIG. 9C, the electrical circuit schematic of the automatic direction finding signal processor 440 is identical in electrical circuit layout and in electrical circuit connection to the electrical circuit schematic of FIG. 4C with the exception of the additional switching transistors 746 and 748, the base resistors 750 and 752, the switching signals PP and UU which control the illimination of the center diode 408.10 which is pulsed illuminated for high signal strengths and continuously illuminated for low signal strengths. The electrical component values differ as the switching frequencies differ. The electrical component elements are raised in element numbering by four hundred with respect to FIG. 4C for the convenience of reference. The audio signal from the amplitude detector of the AM receiver 400 connects to the coupling capacitor 614 and contains the carrier phase shifted modulated audio output signal which is proportional in amplitude to the signal strength between the orthogonally opposed loop antennas 428 and 430 and having a polarity which is dependent upon the direction of the received AM radio frequency signal. A 250 Hz narrow band, high Q filter 458 of FIG. 7, electrical components 614-636 of FIG. 9C, filters the audio signal to pass only the audio at the desired frequency. A 250 Hz amplifier comprising electrical components 638-646 amplifies the filtered signal and the capacitor 644 gives low pass characteristics to the amplifier and adjusts the phase shift of the filtered signal with respect to the JJ and KK 250 Hz synchronous detector switching signals generated in FIG. 9B and illustrated as switching signal waveforms in FIG. 10B. The 250 Hz synchronous detector and buffer 460 of FIG. 7, electrical components 648-656 and 662-672, are switched not only by the JJ and KK 250 Hz synchronous detector switching signals, but also by LL and MM 1 kHz chopper signals. The synchronous detector and buffer is identical in electrical function as previously described in FIG. 4C and for the purpose of brevity, is not repeated. The charge stored on the pair of capacitors 654 and 656, and 668 and 670 is proportional to the vectors representing the signal strengths between the loop antennas 428 and 430. The two vectors together derive a resultant vector on a circle representative of the direction of arrival of the received radio frequency signal with respect to the direction finding antenna array 402. The resultant DC signals stored on the capacitors 654 and 656, and 668 and 670 are buffered by the operational amplifiers 652 and 672 respectively and subsequently chopped by the LL and MM chopper switching signals of FIG. 9B and as illustrated in the switching signal timing waveforms of FIG. 10A, to produce a subsequent summed chopped signal having a continuous phase indication and having a distinct count relationship to the latches 514 and 530 of FIG. 9A. The summed chopped signal at the junction of the resistors 660 and 676 is integrated and filtered by operational amplifier 678 outputting a phase shifted sine wave signal having constant amplitude of a 1 kHz frequency equal to the output of the primary divide-by-36 counter. The sine wave signal is subsequently filtered by the low pass filter 462 of FIG. 7, electrical components 684–700 of FIG. 9C, to eliminate any high frequency components from the phase shifted sine wave output signal. The sweep signal control 464 of FIG. 7, electrical circuit components 704–744 of FIG. 9C, applies the phase shifted sine wave signal having a zero crossing, equal to the direction of the source of the received radio frequency signal with respect to the direction finding antenna array 402, to the crossover detector of FIG. 9C to forward bias switching diode 728 of FIG. 9C to latch the clock input of latches 514 and 530 of FIG. 9A thereby selectively illuminating one segment of the 36 segment circular visual directional display 408 indicating the direction of arrival of the received radio frequency signal with respect to the direction finding antenna array 402 of FIG. 6. At the zero crossing of the phase shifted sine wave output signal, latches 514 and 530 of FIG. 9A latch on the output of the count of the shift registers 512 and 520 which are phase locked with the LL and MM 1 kHz chopper switching signals so that the appropriate selective segment of the segmented circular visual directional display 408 illuminates indicating the direction of arrival of the received radio frequency signal.

FIG. 9D illustrates the thirty-six segment circular visual directional display 408 which functions in the identical manner as previously described for the ADF system 70 for the FM receiver 20 in sequentially illuminating the display 408 when a radio frequency signal is not being received and in selectively illuminating a segment of the display 408 indicating the originating source of transmission of a received radio frequency signal. As used herein, the term audio output terminal refers to any point within the receiver where detected audio appears, whether or not de-emphasized or filtered. Typically the ADF systems will use the audio directly from the detector.

While there have been described above the principles of this invention in connection with specific apparatus, it is to be clearly understood that this description is made only by way of example and not as a limitation to the scope of the invention.

What is claimed is:

1. In apparatus for use in an automatic direction finding system the combination comprising:
   a. indicator means suitable for display of directional information of a received radio frequency signal;
   b. direction determining means connected to said indicator means for responding to a received signal of a sufficient level and for causing the indicator means to indicate the direction of arrival of the received radio frequency signal; and
   c. sweep means connected to said indicator means for causing said indicator means to sequentially display directions independently of any direction determined by said direction determining means, the sequential display being at a visually perceivable rate.

2. The apparatus of claim 1 comprising control means for automatically preventing the sweep means from operating said indicator means when said direction means indicates the direction of arrival of the received radio frequency signal.

3. The apparatus of claim 1 in which said sweep means includes means for causing sequential display of directions at a rate to sequentially display all directions in from 0.1 to 10 seconds.

4. The apparatus of claim 1 in which said sweep means includes means for causing sequential display of directions at a rate to sequentially display all directions in from about 0.5 to about 1 second.

5. The apparatus of claim 1 in which said sweep means includes means for displaying each direction for from 2.7 to 270 milliseconds.

6. The apparatus of claim 5 wherein said indicator means comprises a segmented visual directional display having a different segment for each direction displayed.

7. The apparatus of claim 6 wherein said indicator means comprises several concentric conductor circles for connection to the segments.

8. The apparatus of claim 1 in which said sweep means includes means for displaying each direction for about 15 milliseconds.

9. The apparatus of claim 8 wherein said indicator means comprises a segmented visual directional display having a different segment for each direction displayed.

10. The apparatus of claim 1 comprising function indicating means for indicating, independently of the indicated direction, whether the direction determining means is causing the indicator to indicate the direction of arrival of a received radio frequency signal.

11. The apparatus of claim 10 in which said function indicating means comprises a visual indicator and which apparatus additionally comprises means for causing said visual indicator to flash when a high level radio frequency signal is being received.

12. The apparatus of claim 10 in which said function indicating means includes a light emitting diode.

13. The apparatus of claim 12 which additionally comprises means for causing said light emitting diode to flash when a high level of radio frequency signal is being received.

14. The apparatus of claim 1 wherein said indicator means comprises a segmented visual directional display in which said segments are positioned on the circumference of a circle.

15. The apparatus of claim 14 in which each of said segments comprises a light emitting diode.

16. The apparatus of claim 14 comprising function indicating means, located at the center of said circle, for indicating, independently of the indicated direction, whether the direction determining means is causing the indicator to indicate the direction of arrival of a received radio frequency signal.

17. The apparatus of claim 14 wherein said segmented visual directional display comprises a thirty-six segment circular visual directional display.

18. The apparatus of claim 17 in which each of said segments comprises a light emitting diode.

19. The apparatus of claim 14 in which said sweep means includes means for causing sequential display of directions at a rate to sequentially display all directions in from 0.1 to 10 seconds.

20. The apparatus of claim 19 comprising control means for automatically preventing the sweep means from operating said indicator means when said direction means indicates the direction of arrival of the received radio frequency signal.

21. The apparatus of claim 19 in which visual indicating elements are light emitting diodes.

22. The apparatus of claim 21 in which said display includes 36 visual indicating elements.

23. The apparatus of claim 14 in which said sweep means includes means for causing sequential display of directions at a rate to sequentially display all directions in from about 0.5 to about 1 second.

24. Apparatus for use in an automatic direction finding system, the combination comprising:
 a. a radio receiver for receiving audio signals from modulated radio frequency signals, said receiver having an antenna input terminal and an audio output terminal;
 b. a first directionally sensitive antenna means for providing information about a received signal for a first vector, said first vector being a component of the direction from which said received signal arrived;
 c. a second directionally sensitive antenna means for providing information about a received signal for a second vector, said second vector being a component of the direction from which said received signal arrived, said second directionally sensitive antenna means being oriented to be directionally sensitive in a different direction than said first directionally sensitive antenna means;
 d. means for alternately, at a first rate, making said first antenna means and said second antenna means operatively coupled to the antenna input terminal of said radio receiver;
 e. means for modulating received signals from said first and second antenna means to incorporate said directional vector information as modulation which is at an audio frequency rate, said audio frequency rate being substantially greater than said first rate;
 f. detection and storage means coupled to said audio output terminal for alternately, and in synchrony with said first rate, detecting the audio frequency information and separately storing it to establish individual vector values for each said antenna means; and
 g. indicator means responsive to said stored information to indicate the actual direction represented by the stored values.

25. The apparatus of claim 24 comprising a narrow bandpass filter at said audio frequency rate connected to said audio output terminal and coupling the signal there to said detection and storage means.

26. Apparatus for use in an automatic direction finding system, the combination comprising:
 a. first directionally sensitive antenna means for providing information about a received signal for a first vector, said first vector being a component of the direction from which said received signal arrived;
 b. second directionally sensitive antenna means for providing information about said received signal for a second vector, said second vector being a component of the direction from which said received signal arrived;

c. multiplexing means for processing said received signal (1) to be modulated to include include a first constant frequency audio component at a level corresponding to said first vector and having at least several adjacent audio frequency cycles corresponding to said first vector and (2) to be modulated to include a second constant frequency audio component at a level corresponding to said second vector and having at least several adjacent audio frequency cycles corresponding to said second vector;

d. audio detecting means to detect an audio signal from said multiplexed received signal;

e. vector detector means to separately detect from said audio signal signals corresponding to said first and second vectors; and f. indicator means responsive to said vector detector means to indicate the actual direction from which said received radio frequency signal arrived.

27. The apparatus of claim 26 wherein said vector detector includes a narrow bandpass, high Q, filter at said audio frequency of said first constant frequency audio component.

28. The apparatus of claim 26 in which
(a) said second directionally sensitive antenna means comprises means for providing information about said received signal for a second vector which is perpendicular to said first vector;
(b) said multiplexing means includes means for modulating the received signal so that said second constant frequency audio component is at a level corresponding to the perpendicular second vector; and
(c) said vector detector includes means for separately detecting from said audio signal, signals that correspond to said first vector and said second vector that is perpendicular thereto.

29. The apparatus of claim 26 in which said multiplexing means includes means for modulating said received signal to include a first constant frequency audio component at a frequency of between 30 Hz and 3,000 Hz at a level corresponding to said first vector and includes means for modulating said received signal to include a second constant frequency audio component at a frequency of between 30 Hz and 3,000 Hz at a level corresponding to said second vector.

30. The apparatus of claim 26 in which said multiplexing means includes means for periodically alternating between;
(a) modulating said received signal during a first time period to include a first constant frequency audio component at a first frequency and at a level corresponding to said first vector and
(b) modulating said received signal during a second time period to include a second constant frequency audio component at said first frequency and at a level corresponding to said second vector.

31. The apparatus of claim 30 in which the multiplexing means includes means for causing each of said first and said second time periods to be from 10 to 500 milliseconds.

32. The apparatus of claim 30 wherein said first antenna means includes two spaced antennas alternately chopped and periodically switched at an audio frequency switching rate to phase modulate said received signal and said second direction antenna means includes two spaced antennas, one antenna which is not shared by said first direction antenna means, alternately chopped and periodically switched at an audio frequency switching rate to phase modulate said received signal.

33. The apparatus of claim 30 wherein said first antenna means includes a first loop antenna and a sense antenna in which said first loop antenna received signal is alternately and periodically added in opposite phase to said sense antenna received signal at an audio frequency switching rate to amplitude modulate said received signal and said second antenna means includes a second loop antenna sharing said sense antenna in which said second loop antenna received signal is alternately and periodically added in opposite phase to said sense antenna received signal at an audio frequency switching rate to amplitude modulate said received signal.

34. The apparatus of claim 30 wherein said vector detector means includes storage means for storing said first and second vectors.

35. The apparatus of claim 34 wherein said vector detector means includes means for adjusting the value of a signal corresponding to said first vector only during the second half of said first time period and for adjusting the value of a signal corresponding to said second vector only during the second half of said second time period.

36. A direction finding antenna array for use with a frequency modulation receiver having an antenna terminal to receive a frequency modulated audio frequency signal and for use with an FM automatic direction finding system having first and second antenna commutation switching signals, said direction finding antenna array comprising:
a. first pair of antennas means, said pair of antennas means spaced less than one half wavelength apart and first switching means for switching between said first pair of antennas means in response to said first antenna commutating switching signal;
b. second pair of antennas means orthogonally opposed to said first pair of antennas means, said second pair of antennas means spaced a distance equal to the spacing of said first pair of antennas means and second switching means for switching between said second pair of antennas means in response to said second antennas commutating switching signal; and
c. means for connecting together the outputs of (1) said first antenna means switched by said first antenna commutating switching signal and (2) said second antenna means switched by said second antenna commutating switching signal, whereby said switched rf signals may be connected to said antenna terminal of said frequency modulation receiver through a single coaxial cable.

37. The direction finding array of claim 36 in which each antenna is a dipole antenna and all of the dipoles are parallel.

38. The direction finding array of claim 36 in which each dipole is at the corner of a square and which additionally includes support members extending along the diagonals of the square.

39. The direction finding array of claim 38 which additionally includes a mast which is perpendicular to said support members and extends to the center of the square.

40. A direction finding antenna array for use with an amplitude modulation receiver having an antenna terminal to receive an AM radio frequency signal and for use with an amplitude modulated automatic direction finding system having first and second antenna commutating switching signals, said direction finding antenna array comprising:

a. first and second loop antenna means orthogonally positioned with respect to each other including electrostatic shield means surrounding each of said loop antenna means and insulator means electrically breaking each of said electrostatic shield means at the loop apexes; and b. sense antenna means positioned through the apex of said first and second loop antenna means.

41. The direction finding antenna array of claim 40 in which said loops are rectangular in shape and said sense antenna means includes vertical whip having a loading coil immediately above the apex.

42. An automatic direction finding system used with an FM receiver having an antenna terminal to receive a frequency modulated radio frequency signal and an audio output terminal said combination comprising:

a. oscillator means to generate a clock source of frequency;

b. divider means connected to said oscillator means to selectively divide said frequency of said oscillator means and generate chopper signals;

c. latch means connected to said divider means to retain a selected count of said divider means;

d. segmented circular display means connected to said latch means to display the retained count;

e. switching signal means connected to said divider means to generate antenna commutating switching signals and synchronous detector switching signals;

f. sweep display means connected between said oscillator means and said switching signal means and to said latch means to sequentially illuminate said display means in a circular direction when said receiver is not receiving a radio frequency signal of sufficient strength;

g. direction finding antenna array means including antenna means orthogonally positioned with respect to each other, switching means for switching said antenna means and said antenna means switched by said antenna commutating switching signals of said switching signal means and said antenna means connected to said antenna terminal of said FM receiver;

h. first filter means connected to said audio output terminal of said FM receiver;

i. synchronous detector means serially connected with buffer means to said first filter means to process vector information for each of said antenna means and said synchronous detector means switched by said synchronous detector switching signals of said switching signal means;

j. chopper means connected to each of said buffer means and switched by said chopper signals of said divider means;

k. second filter means connected to said chopper means to integrate said filter said signals from said chopper means and outputting a signal having a phase component; and l. sweep signal control means connected between said second filter means and said latch means to detect a zero crossover of the phase component of said signal from said second filter means whereby said sweep signal control means latches said latch means on a count of said divider means and said divider means phased locked to said chopper signals thereby selectively illuminating a segment of said display means indicating the direction of arrival of the rf signal received by said direction finding antenna array means.

43. The automatic direction finding system of claim 42 wherein said oscillator means comprises a 10.240 MHz crystal synthesized source of clock frequency from said FM receiver of an FM marine radio telephone transceiver.

44. The automatic direction finding system of claim 42 wherein said divider means comprises a divide-by-36 divider.

45. The automatic direction finding system of claim 44 wherein said divider means comprises a divide-by-nine binary counter and a divide-by-four shift register connected to said divide-by-nine binary counter, said divide-by-four shift register outputting a 1.11 kHz signal.

46. The automatic direction finding system of claim 44 wherein said display means comprises a nine-by-four light emitting diode matrix connected to said latch means whereby said diodes are arranged on the circumference of a circle thereby forming a thirty-six segment circular visual directional display to selectively illuminate a segment diode of said matrix indicating the direction of arrival of the received radio frequency signal.

47. The automatic direction finding system of claim 42 which additionally includes means for producing said first and second antenna commutating switching signals at a frequency of about 1 kHz.

48. The automatic direction finding system of claim 42 wherein said switching signal means comprises a divide-by-four circuit connected to the output of said divider means, a counter connected to said divide-by-four circuit, and a plurality of logic gate means connected to said divider means and said divide-by-four circuit means whereby said plurality of logic gate means outputs first and second antenna commutating switching signals, and first and second synchronous detector signals.

49. The automatic direction finding system of claim 48 which additionally includes means for producing said first and second antenna commutating switching signals at about 1 kHz and for alternately switching between said first and second antenna commutating switching signals at about 15 Hz.

50. The automatic direction finding system of claim 49 wherein said switching signal means comprises means for alternately producing said first and second synchronous detector signals at about 1 kHz only during the second halves of the periods of a 15 Hz signal.

51. The automatic direction finding system of claim 42 wherein said sweep display means comprises a pulse swallower means and a counter means whereby said counter means produces an output in phase with said divider means for a predetermined number of counts and then shifts in phase for one count when said pulse swallower swallows a pulse thereby advancing said latch means one count and thereby sequentially advancing a segment of said segmented display means in a circular direction.

52. The automatic direction finding system of claim 42 wherein said latch means comprises quad D clocked latches connected to said divider means.

53. The automatic direction finding system of claim 42 wherein said sweep display means comprises means for advancing said segmented display means at 0.1 to 10 revolutions per second when no radio frequency signal is present.

54. The automatic direction finding system of claim 42 wherein said antenna means comprise pairs of dipole antennas having the center conductor of each dipole antenna spaced a fractional wave length from each of said other dipole antennas.

55. The automatic direction finding system of claim 42 wherein said switching means for each pair of antenna means comprises two PIN switching diodes connected between each of said pair of antenna means and each of said antenna commutating switching signals.

56. The automatic direction finding system of claim 42 wherein said first filter means comprises a 1.11 kHz narrow bandpass filter.

57. The automatic direction finding system of claim 56 wherein said first filter means comprises an active filter and alternating current amplifier connected to said active filter.

58. The automatic direction finding system of claim 42 wherein each of said synchronous detector means comprises a bilateral switch serially connected with an operational amplifier whereby said bilateral switch is switched by said synchronous detector signal of said switching signal means.

59. The automatic direction finding system of claim 58 wherein each of said bilateral switches are CMOS.

60. The automatic direction finding system of claim 42 wherein each of said chopper means comprises a bilateral switch whereby said bilateral switch is switched by said chopper signal of said divider means.

61. The automatic direction finding system of claim 42 wherein said second filter means comprises an active low pass filter whereby said second filter filters out high frequency components.

62. The automatic direction finding system of claim 61 comprising a manually adjustable electronic directional calibration means connected between said second filter means and said sweep signal control means whereby said directional calibration means provides the range of ten degrees of adjustment.

63. The automatic direction finding system of claim 42 wherein said sweep signal control means comprises a crossover detector network means whereby said network means latches said latch means thereby causing said display means to selectively illuminate a segment of said display means to indicate the direction of arrival of the radio frequency signal received by the direction finding antenna array means.

64. The automatic direction finding system of claim 42 comprising signal illumination means connected to said sweep control means whereby said signal illumination means illuminates during reception of a frequency modulated signal.

65. The automatic direction finding system of claim 42 comprising means to hold said latch means in a latched state for a predetermined time period after said received radio frequency signal ceases whereby said predetermined time period allows said display means to hold said selective illuminated segment illuminative thereby holding the direction finding fix on said display means.

66. The automatic direction finding system of claim 65 wherein said hold means comprises a capacitor.

67. The automatic direction finding system of claim 42 wherein said automatic direction finding system is hard wired and mechanically secured with said FM receiver.

68. The automatic direction finding system of claim 42 wherein a coaxial transmission line connects said direction finding antenna array means to said antenna terminal of said FM receiver and two conductors connect said antenna commutating switching signals to said switching means of said direction finding antenna array means.

69. The automatic direction finding system of claim 42 wherein said sweep display means comprises means for causing said sequential illumination of each segment of said display means to operate at a visually perceivable rate when no signal is being received.

70. In a combination of an automatic direction finding system used with an AM receiver having an antenna terminal to receive an amplitude modulated audio frequency signal, having an audio output terminal and generating an automatic gain control signal, said combination comprising:
 a. oscillator means to generate a clock source of frequency;
 b. divider means connected to said oscillator means to selectively divide said frequency of said oscillator means and generate chopper signals;
 c. latch means connected to said divider means to retain a selected count of said divider means;
 d. segmented display means connected to said latch means to display the retained count of said latch means;
 e. switching signal means connected to said divider means to generate loop antenna commutating switching signals, synchronous detector signals, and a loop commutating signal;
 f. sweep display means connected between said oscillator means and said switching signal means and to said latch means to sequentially illuminate said display means in a circular direction when said receiver is not receiving a radio frequency signal of sufficient strength;
 g. direction finding antenna array means including two loop antennas means orthogonally positioned with respect to each other and a sense antenna positioned at the intersection of said loop antenna means;
 h. loop antenna selector means connected to each of said loop antenna means and switched by said loop antenna commutating switching signals of said switching signal means;
 i. loop antenna phase splitter means serially connected to said loop selector means;
 j. loop commutator means connected to said phase splitter means and switched by said loop commutating signal generated by said switching signal means;
 k. automatic gain control and threshold adjustment means connected to said AM receiver;
 l. first filter means connected to said audio output terminal of said AM receiver;
 m. synchronous detector means serially connected with buffer means to said first filter means to process phase information for each of said loop antenna means and said synchronous detector means switched by said synchronous detector switching signals of said switching signal means;
 n. chopper means connected to each of said buffer means and switched by said chopper signals of said divider means;
 o. second filter means connected to said chopper means to integrate and filter said signals from said chopper means outputting a signal having a phase component; and p. sweep signal control means connected between said second filter means and said latch means to detect a zero crossover of the phase component of said signal from said second filter means whereby said sweep signal control means latches said latch means on a count of said divider means and said divider means phased locked to said chopper signals thereby selectively illuminating said display means indicating the direction of arrival of the rf signal received by said direction finding antenna array means.

71. The automatic direction finding system of claim 70 wherein said divider means comprises a divide-by-36 divider outputting a 1 kHz signal.

72. The automatic direction finding system of claim 70 wherein said switching signal means comprises means for alternately producing said first and second loop antenna commutating switching signals at about 250 Hz during alternate periods of a 15 Hz signal.

73. The automatic direction finding system of claim 72 wherein each of said chopper means comprises a bilateral switch connected to said chopper signal of said divider means.

74. The automatic direction finding system of claim 70 wherein said switching signal means comprises means for alternately producing said first and second synchronous detector signals at about 250 Hz only during the second halves of the periods of a 15 Hz switching signal.

75. The automatic direction finding system of claim 70 wherein said loop antenna means comprises a tuning capacitor connected across each said loop antenna means.

76. The automatic direction finding system of claim 70 wherein said sense antenna means comprises a vertical antenna and a loading coil on said vertical antenna whereby said loading coil provides for a reduced length of said vertical antenna.

77. The automatic direction finding system of claim 70 wherein said automatic gain control and threshold adjustment means comprises an operational amplifier whereby said amplifier adjusts the automatic gain control signal from said AM receiver.

78. The automatic direction finding system of claim 70 which additionally includes a summation amplifier means for summing received ratio signals from said sense antenna with said loop commutated signal from said loop commutator means, with said loop commutated signal being at a reduced injection level to said radio frequency signal from said sense antenna means.

79. The automatic direction finding system of claim 78 wherein said summation amplifier means comprises means for causing said injection level of said loop commutated signal to be about 20 percent of the level of the radio frequency signal from said sense antenna means.

80. The automatic direction finding system of claim 70 wherein said first filter means comprises a 250 hertz low pass filter.

81. The automatic direction finding system of claim 70 wherein said first filter means comprises an active filter in series with an alternating current amplifier connected to said active filter.

82. The automatic direction finding system of claim 70 wherein said automatic direction finding system is hard wired and mechanically secured with said AM receiver.

83. The automatic direction finding system of claim 82 wherein said AM receiver is in a Citizens Radio Service amplitude modulated transceiver.

84. The automatic direction finding system of claim 70 wherein said display means comprises a nine-by-four light emitting diode matrix connected to said latch means whereby said diodes are arranged on the circumference of a circle thereby forming a thirty-six segment circular visual directional display for selective illumination of a segment diode of said matrix indicating the direction of arrival of the received radio frequency signal.

85. The automatic direction finding system of claim 70 wherein said switching signal means comprises a binary counter and a plurality of logic gate means connected to said binary counter to output
   (a) first and second loop antenna commutating switching signals, and
   (b) first and second synchronous detector signals at the outputs of said logic gate means.

86. The automatic direction finding system of claim 85 wherein said switching signal means comprises means for alternately producing said first and second loop antenna commutating switching signals at about 250 Hz during alternate periods of a 15 Hz signal.

87. The automatic direction finding system of claim 86 wherein said switching signal means further comprises means for alternately producing said first and second synchronous detector signals at about 250 Hz only during the second halves of the periods of a 15 Hz signal.

88. The automatic direction finding system of claim 70 wherein said sweep display means comprises a pulse swallower means and a counter means whereby said counter means produces an output in phase with said divider means for a predetermined number of counts and then shifts in phase for one count when said pulse swallower swallows a pulse thereby advancing said latch means one count and thereby sequentially advancing a segment of said segmented display means in a circular direction.

89. The automatic direction finding system of claim 70 wherein said latch means comprises quad D clocked latches connected to said divider means.

90. The automatic direction finding system of claim 70 wherein said sweep display means comprises means for advancing said segmented display means at 0.1 to 10 revolutions per second when no radio frequency signal is present.

91. The automatic direction finding system of claim 70 wherein each of said synchronous detector means comprises a bilateral switch serially connected with an operational amplifier whereby said bilateral switch is switched by said synchronous detector signal of said switching signal means.

92. The automatic direction finding system of claim 91 wherein each of said bilateral switches are CMOS.

93. An automatic direction finding signal processor, for use in an automatic direction finding system having synchronous detector and chopper switching signals phase locked, which processes a demodulated audio output signal from a receiver having direction finding antenna means, said signal processor comprising:

a. first filter means connected to said audio output terminal of said receiver to filter said carrier phase shifted signal from said audio signal;

b. synchronous detector means serially connected with buffer means to said first filter means to process phase information for each of said means and switched by said synchronous detector antenna means and said synchronous detector switching signals of said automatic direction finding system;

c. chopper means connected to each of said buffer means and switched by said chopper switching signals of said automatic direction finding system;

d. second filter means connected to said chopper means to integrate and filter said signals from said chopper means outputting a signal having a phase shift component indicative of the direction of arrival of the received rf signal; and e. control means connected to said second filter means to detect a zero crossover of said phase component of said signal whereby said zero crossover point is indicative of the direction of arrival of the radio frequency signal.

94. The automatic direction finding signal processor of claim 93 wherein said first filter means comprises an active L-C filter.

95. The automatic direction finding signal processor of claim 94 wherein said center frequency of said active filter is equal to the frequency of said synchronous detector means.

96. The automatic direction finding signal processor of claim 95 wherein each of said synchronous detector means comprises a bilateral switch serially connected to an operational amplifier whereby said bilateral switches are switched by said synchronous detector switching signals of said automatic direction finding system.

97. The automatic direction finding signal processor of claim 96 wherein said control means comprises an operational amplifier and a diode connected to the output of said operational amplifier whereby said diode is forward biased by said operational amplifier on detecting a zero crossover.

98. The automatic direction finding signal processor of claim 93 which additionally includes means for adjusting the phase of the signal from said second filter means.

99. In apparatus for use in an automatic direction finding system, the combination comprising:

a. indicator means suitable for display of directional information of a received radio frequency signal and including:

(1) an oscillator means to generate a clock source of frequency;

(2) divider means connected to said oscillator means to selectively divide said frequency of said oscillator means and generate phase coherent chopper signals;

(3) latch means connected to said divider means to retain a selected count of said divider means; and (4) display means connected to said latch means to display the retained count of said latch means; and b. direction determining means including:

(1) means for obtaining two individual vector value signals which are representative of vector components of the direction of arrival of the received radio frequency signals;

(2) chopper means for chopping said vector value signals in response to said chopper signals and for combining the chopped signals; and (3) phase detector means responsive to the phase of the combined chopped signal for latching said latch means in synchrony with the phase of the combined chopped signal.

100. The apparatus of claim 99 in which said divider means comprises means for producing said chopper signals in the form of two square wave signals with 90° phase difference.

101. The apparatus of claim 100 which additionally includes a band pass filter at the frequency of said chopper signals between said chopper means and said phase detector.

102. The apparatus of claim 101 which additionally includes a zero crossing detector in said phase detector.

103. The apparatus of claim 102 in which said divider means comprises means for producing said chopper signals at a frequency of about 1 kHz.

104. The apparatus of claim 99 in which said phase detector means includes a signal threshold detector with feedback which changes the threshold point from a zero crossover point to a defined offset whereby a diminished sine wave input will not vary the result and a direction signal squelch point is achieved for very low input signals.

105. The apparatus of claim 104 in which said threshold detector comprises an operational amplifier having the sine wave input at the inverted input, and having, at the non-inverted input, two equal value resistors and one much smaller resistor, one of said two equal value resistors connecting to the output of said operational amplifier and the other to a supply voltage, and the smaller resistor connecting to a voltage of the zero crossing value.

* * * * *